United States Patent

Sano et al.

[11] Patent Number: 5,526,058
[45] Date of Patent: Jun. 11, 1996

[54] VIDEO SIGNAL ADJUSTING APPARATUS, DISPLAY USING THE APPARATUS, AND METHOD OF ADJUSTING THE DISPLAY

[75] Inventors: Yuji Sano, Zushi; Toshimitsu Watanabe; Kouji Kitou, both of Yokohama; Sadao Tsuruga, Fujisawa, all of Japan

[73] Assignee: Hitachi, Ltd., Tokyo, Japan

[21] Appl. No.: 219,271

[22] Filed: Mar. 29, 1994

[30] Foreign Application Priority Data

| Mar. 29, 1993 | [JP] | Japan | 5-069574 |
| Feb. 15, 1994 | [JP] | Japan | 6-017998 |

[51] Int. Cl.$^6$ .................................................. H04N 9/69
[52] U.S. Cl. ........................... 348/647; 348/675; 348/679; 348/692; 327/350; 327/563
[58] Field of Search .................................. 348/645, 647, 348/649, 655, 656, 675, 674, 679, 707, 692; 358/72, 164; 327/350, 562, 563; H04N 9/69

[56] References Cited

U.S. PATENT DOCUMENTS

| 4,225,794 | 9/1980 | Buff | 327/350 |
| 4,346,352 | 8/1982 | Baetke | 327/350 |
| 5,062,942 | 11/1991 | Kambara et al. | 250/458.1 |
| 5,087,966 | 2/1992 | Harradine | 348/675 |
| 5,162,654 | 11/1992 | Kostichka et al. | 250/458.1 |
| 5,223,799 | 6/1993 | Yamate | 327/350 |
| 5,255,093 | 10/1993 | Topper et al. | 348/675 |

FOREIGN PATENT DOCUMENTS

| 0314045 | 5/1989 | European Pat. Off. | G01N 27/26 |
| 3618605 | 12/1987 | Germany | G01N 30/90 |
| 60-82145 | 5/1985 | Japan | G01N 21/59 |
| 63-47113 | 12/1988 | Japan . | |
| 4162828 | 6/1992 | Japan | H03M 1/16 |

Primary Examiner—Safet Metjahic
Assistant Examiner—Jeffrey S. Murrell
Attorney, Agent, or Firm—Antonelli, Terry, Stout & Kraus

[57] ABSTRACT

A color corrector receiving a video signal as an input signal and producing an output signal representing a function of power of the input signal includes a logarithmic converter for achieving a logarithmic conversion of the input signal and outputting a resultant signal, a variable gain amplifier for altering amplitude of the signal from the logarithmic converter and outputting an obtained signal, and an antilogarithmic converter connected to the amplifier for outputting a signal representing an exponential function of the signal from the amplifier.

42 Claims, 28 Drawing Sheets

VIDEO SIGNAL ADJUSTING APPARATUS, DISPLAY USING THE APPARATUS, AND METHOD OF ADJUSTING THE DISPLAY

BACKGROUND OF THE INVENTION

The present invention relates to a color corrector, a signal converter, a video display using the corrector and the converter, and a method of adjusting the display suitable for a gamma correction and a white balance adjustment related to a video signal processing in a video apparatus such as a video display, a television receiver, a printer, or a camera.

In this connection, the term "color corrector" adopted in this specification is defined to include apparatuses which conduct, in addition to the color correction of signals of three primary colors including red, green, and blue, the video signal correction and gradation correction for video displays handling monochrome and black-and-white video signals.

There has been known a gamma correction circuit for a display, a video camera, or the like, for example, as shown in FIG. 2 of the Japanese Utility Model application publication No. JP-U-63-47113. In the gamma correction circuit of this diagram, assuming a relationship Va<Vb<Vc<Vd between potential values Va, Vb, Vc, and Vd respectively of the power sources 30, 33, 36, and 39, a conductive state is respectively established in diodes 32, 35, 38, and 41 as a voltage applied on an input terminal 1 is increased.

Consequently, when a voltage signal having a waveform 42 of FIG. 3 of the utility model publication above is applied to the input terminal 1, there is attained from an output terminal 5 an inverse output signal having a waveform 43 which can be approximated to a $\gamma$-th power of the input signal. In consequence, using a gamma correction circuit of FIG. 2, there can be approximately obtained a proportional relationship between an input light quantity and an output light quantity respectively of the transmission and reception systems.

However, according to the gamma correcting circuit described in the JP-U-63-47113, the $\gamma$-th power transfer characteristic is implemented as indicated by a broken-line approximation and hence there cannot be sufficiently attained a satisfactory correction precision. This makes it difficult to develop a high-fidelity reproduction of colors between the video sending and receiving systems. In addition, when it is desired to cope with changes in the parameter $\gamma$ associated with correction due to variation in devices or the like, there is required alteration in values of a large number of constituent elements. Namely, this is impossible in practices.

SUMMARY OF THE INVENTION

It is therefore a first object of the present invention to provide a color corrector in which the correction precision of a gamma correction circuit is improved and the gamma parameter of the circuit can be easily changed.

Moreover, a second object of the present invention is to apply the color corrector to various video apparatuses, thereby improving performance and functions of the apparatuses.

In an embodiment of the color corrector according to the present invention, an input signal is applied to an input terminal of a logarithmic converter, an output terminal of the logarithmic converter is linked to an input terminal of a variable gain amplifier, and an output terminal of the amplifier is connected to an input terminal of an exponential or antilogarithmic converter.

Moreover, the color corrector according to the present invention is applied to the following video apparatuses and systems using such apparatuses. The video apparatuses include, for example, video displays employing display elements such as a Braun tube, a liquid-crystal display panel, a plasma display panel, and a light-emission-diode (LED) panel; video input devices such as a video camera and a scanner, video output devices such as a printer and an electronic camera; and a computer system, a broadcast and communication system, and the like using above apparatuses and/or devices.

In the embodiment of the color corrector according to the present invention, the logarithmic converter achieves a function to replace a computation of power with a multiplication for easily computation. Furthermore, the amplifier has a function to vary the value of the $\gamma$ parameter. In addition, the antilogarithmic converter carries out a function to restore the multiplication to the computation of power, thereby implementing the color corrector.

Each of the apparatuses and systems to which the color corrector of the present invention is applicable includes an internal circuit having a nonlinear characteristic to be corrected.

BRIEF DESCRIPTION OF THE DRAWINGS

These and other objects and advantages of the present invention will become apparent by reference to the following description and accompanying drawings wherein.

DESCRIPTION OF TEE PREFERRED EMBODIMENTS

Figure 1:
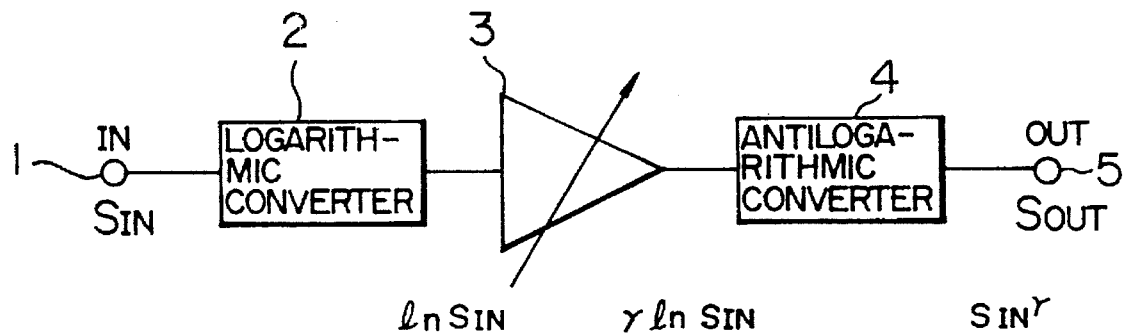
FIG. 1 is a block diagram showing a color corrector in a first embodiment according to the present invention.
Figure 2:
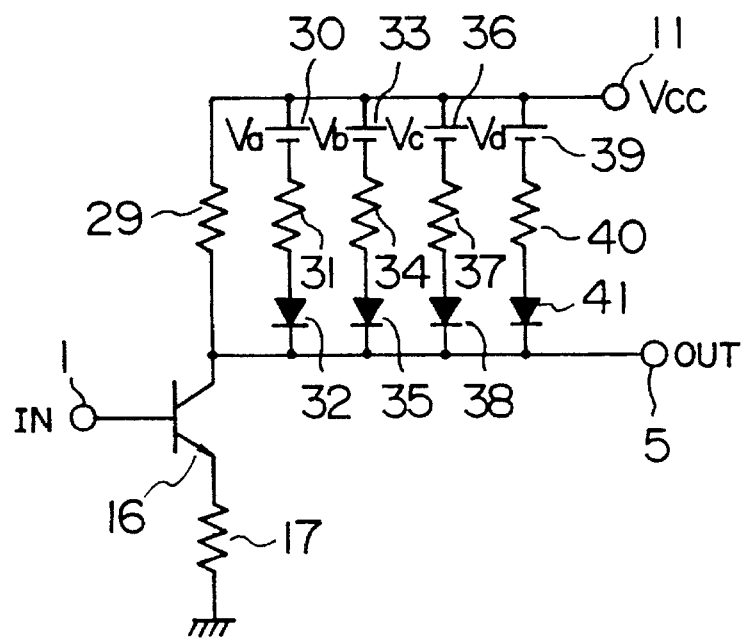
FIG. 2 is a diagram showing a conventional gamma correction circuit.
Figure 3:
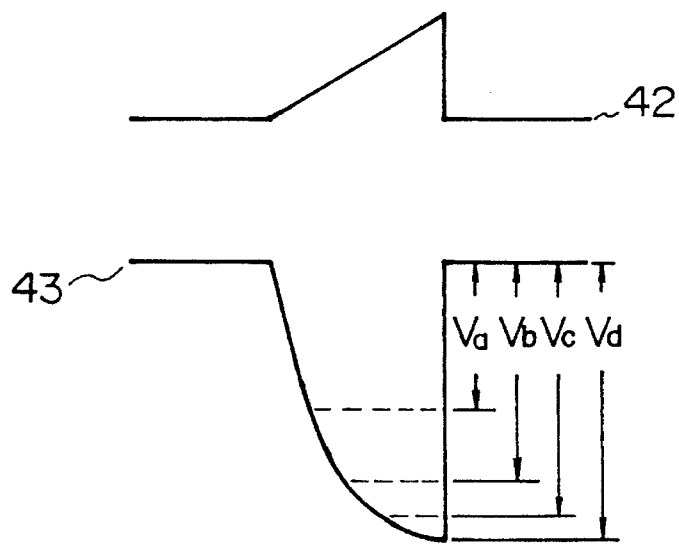
FIG. 3 is a diagram showing waveforms respectively of input and output signals of the gamma correction circuit of FIG. 2.

FIG. 1 shows in a block diagram a color corrector in a first embodiment according to the present invention. As can be seen from FIG. 1, the color corrector of the present invention includes a series connection of a logarithmic converter 2, a variable gain amplifier 3, and an antilogarithmic converter 4. This converter is operable in two signal modes for the voltage and current signal operations. In FIG. 1, an input signal $S_{IN}$ supplied to an input terminal 1 of the color corrector is converted by the logarithmic converter 2 into $\ln(S_{IN})$ to be fed to the amplifier 3 of the next stage. The converter 2 replaces a variable power operation via the variable gain amplifier 3 into a variable multiplication for easy computation, which is an essential purpose of the present invention. In consequence, the amplifier 3 is used to alter the gamma parameter. In this connection, there may be used a variable attenuator as the amplifier 3. Assume that the amplifier 3 has a gain γ. In the antilogarithmic converter 4 of the subsequent state, there is accomplished a signal conversion from $\gamma \ln(S_{IN})$ into $S_{IN}^{\gamma}$. The resultant signal is obtained from an output terminal 5. In this way, there is developed a γ-th power curve characteristic unlike the characteristic of broken-line approximation of the prior art. Consequently, according to the embodiment, the correction precision of the color corrector is remarkably increased.

Figure 4:
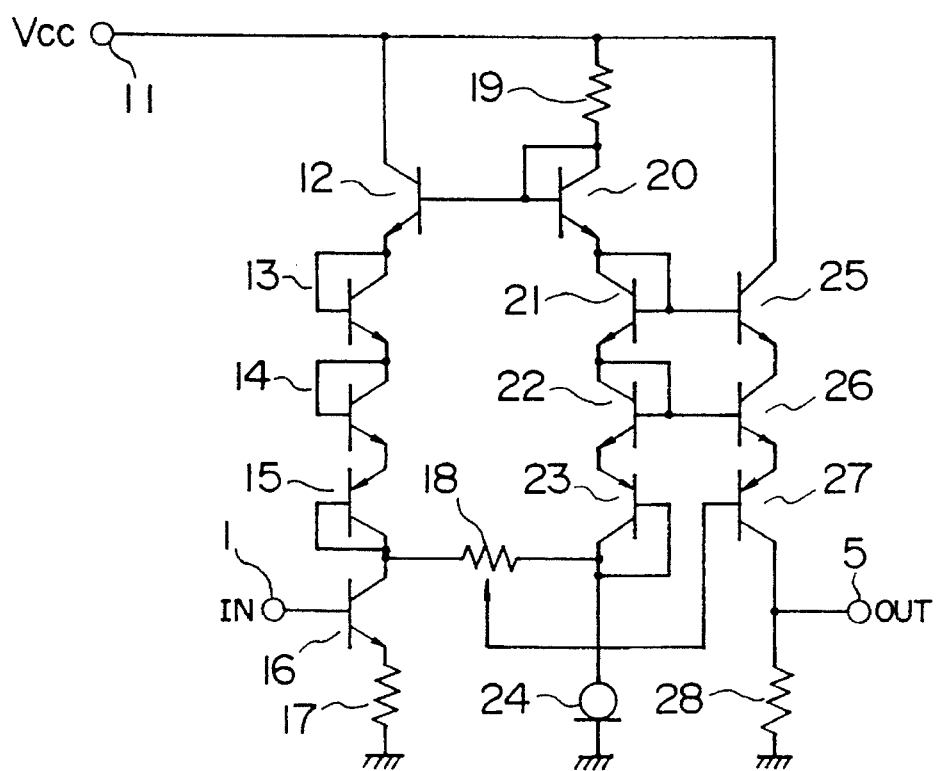
FIG. 4 is a circuit diagram showing a first specific embodiment of the color corrector of FIG. 1.

FIG. 4 shows a first concrete example of the circuit of the color corrector shown in FIG. 1. According to an aspect of this example, the system is configured in a simple circuit structure. In operation of the corrector of FIG. 4, a signal supplied from an input terminal 1 is converted into a logarithmic voltage by a logarithmic converter 2 including transistors 12 to 16 to be then attenuated through a variable attenuator (employed as the variable gain amplifier 3 having the gain less than one) including a low-priced variable resistor 18. Thereafter, the attained signal is fed to an antilogarithmic converter 4 including transistors 25 to 27 to be converted into a signal current having a γ-th power characteristic. The resultant signal is obtained from an output terminal 5. In the operation, the input signal may be in either one of the voltage and current forms. As shown in FIG. 4, connecting a resistor 28 between a collector of the transistor 27 and a grounding point with respect to the alternate current, there can be attained the output signal in the voltage format. In the logarithmic converter 2, a signal current Ic attained from a grounded-emitter circuit including the transistor 16 and a resistor 17 is converted into a logarithmic voltage $4V_T \ln(Ic/i_s)$ between the base and the emitter through a 4-stage circuit including the transistors 12 to 15, where $V_T$ and $i_s$ are respectively the thermal voltage and the saturation current in the p-n junction. Assume that the respective transistors have substantially an identical thermal voltage $V_T$ and substantially an identical saturation current $i_s$. Furthermore, a bias circuit including a constant current circuit 24 including a constant current diode and the like, the transistors 20 to 23, and the resistor 19 compensates for the thermal drifts respectively of the thermal voltage $V_T$ and the saturation current $i_s$ of the transistors constituting the logarithmic converter 2 and the antilogarithmic converter 4. In the connecting structure, the number of base-emitter pn junctions of the transistors 20 to 23 is selected to be equal to that of each of the logarithmic converter 2 and the antilogarithmic converter 4. The bias circuit above moreover functions to set a fixed operating point which is independent of the parameter $\gamma$ of the power characteristic of the color corrector. When the value of the collector current of the transistor 16 is equal to that of the constant current circuit 24, the relationship between the input and output signal levels is fixed regardless of the value of the parameter $\gamma$. In consequence, it is possible to use the input signal level as a reference for the color correction. Assume that the signal voltage obtained from a slider terminal of the variable resistor 18 disposed between the logarithmic converter 2 and the bias circuit is expressed as $K \cdot \{4V_T \ln(Ic/i_s)\}$. The value of K can be altered in a range from 0 to 1. In this situation, setting the resistance value of the variable resistor 18 to an appropriate value, the correction precision of the color corrector can be maximized. That is, the resistance value is set to a high value such that the maximum value of the current flowing into the resistor 18 is sufficiently smaller than that of the constant current circuit 24. At the same time, the resistance value is favorably set to a low value such that the voltage drop of the resistor 18 due to the base current of the transistor 27 is negligible. When the signal voltage is supplied to the antilogarithmic converter 4, according to the exponential or antilogarithmic conversion developed by the two-stage base-emitter pn junctions of the transistors 26 and 27, there is obtained from the collector of the transistor 27 an output current which is the $(2\gamma)$th power of Ic. Consequently, in the color corrector of this specific example, there is obtained a characteristic ranging from 0-th power to second power. In a case, like the circuit of FIG. 4, where the color corrector includes a linear circuit having a gain K between the circuits each including series connection of pn-junction elements, when there are included M stages of pn junctions for the logarithmic conversion and N stages of pn junctions for the antilogarithmic conversion, there are attained a power characteristic of (KM/N)th power. In addition, in the circuit of FIG. 4, there is utilized an exponential or antilogarithmic characteristic of the current flowing into the pn junction. However, the color corrector of the specific example can be naturally adopted in any devices and circuits which develop an antilogarithmic characteristic like a field-effect-transistor (FET) and a diode having an antilogarithmic characteristic, for example, in a tail region in the vicinity of the rising edge of the drain current. In addition, to improve precision of the temperature compensation, it is only necessary to use a pair transistor configuration at least for each of the combinations of transistors 12 and 21, 13 and 21, 14, 22, and 26, and 15, 23, and 27. The transistor 25 functions to set an identical collector-emitter voltage for the transistor 26 and 22, thereby suppressing the antilogarithmic conversion error due to the influence of the grounding voltage.

Figure 5:
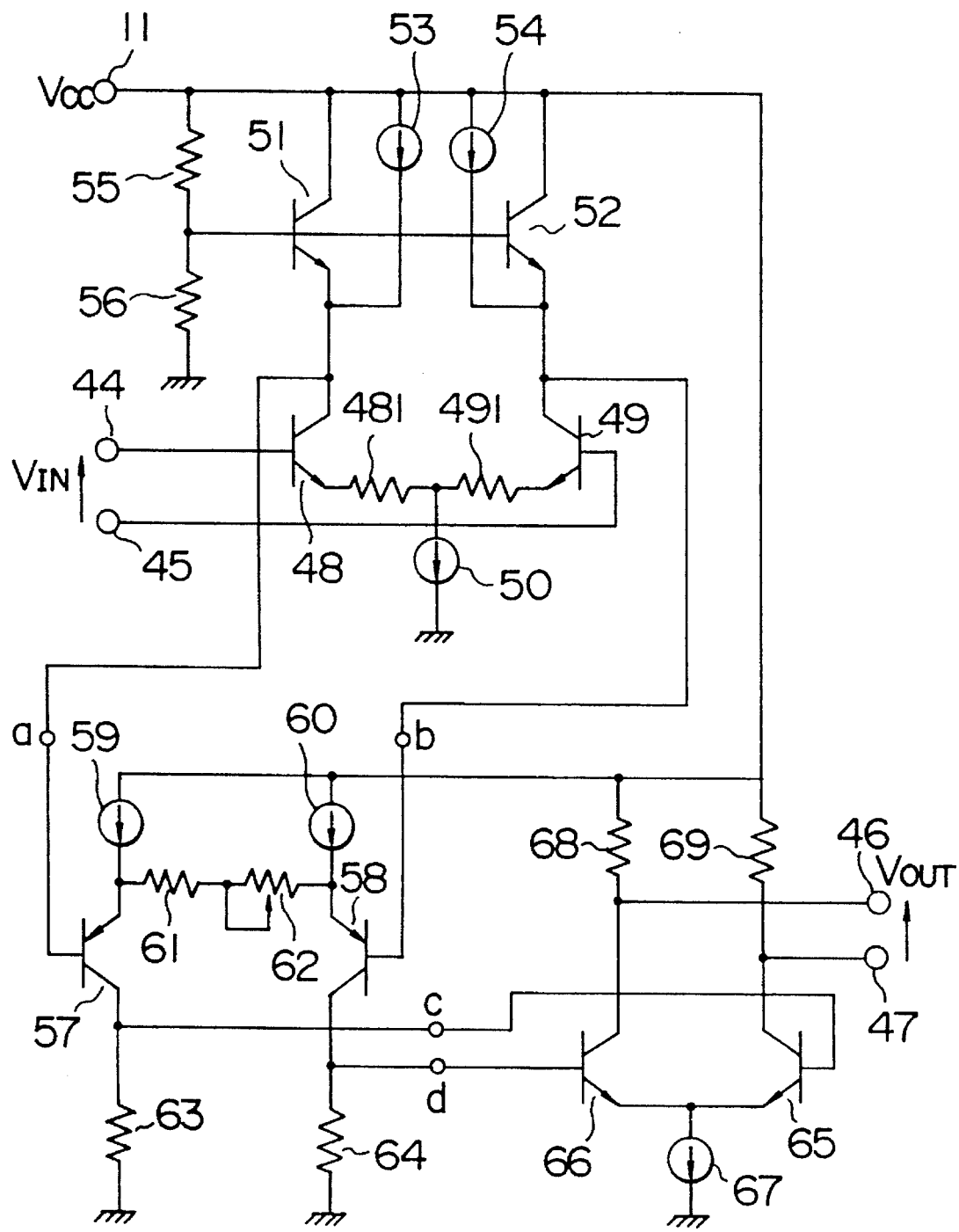
FIG. 5 is a circuit diagram showing a second specific embodiment of the color corrector of FIG. 1.

FIG. 5 shows the circuit configuration of a second specific example of the color corrector shown in FIG. 1. According to an aspect of this example, the input and output signals are handled in a differential mode to expand the application range of the circuit. In the color correction of FIG. 5, an input signal $V_{IN}$ applied across input terminals 44 and 45 is converted, by a logarithmic converter 2 including a differential circuit including transistors 48, 49, 51, and 52, a variable gain amplifier 3 including transistors 57 and 58 and a variable resistor 62, and an antilogarithmic converter 4 including a differential circuit configured with transistors 65 and 66, into an output signal $V_{OUT}$ between output terminals 46 and 47 having a characteristic of power. Thanks to the common mode rejection of the logarithmic converter 2 including the differential circuit, it is possible to connect either one of the input terminals 44 and 45 to the ground in the sense of the alternating current so as to input the signal from only one input terminal. The gain in the logarithmic conversion may be altered by changing the pertinent values of the resistors 481 and 491, respectively. However, when the gain increases, there appears increase in the distortion associated with the logarithmic characteristic of the base-emitter voltage of each of the transistors 48 and 49. In this situation, to prevent the distortion due to the influence of the logarithmic conversion, it is also possible to use current sources 53 and 54. Utilizing the current sources 53 and 54, there is established a bypass for the direct-current (dc) component to increase the ratio of the signal current component in the current flowing through each of the transistors 51 and 52, thereby attaining a high gain without deteriorating the linearity. The current sources 53 and 54 may be respectively substituted for resistors. The resistors need not have an identical resistance value in this case. In addition, in order to increase the gain, to the emitter of each of the transistors 51 and 52 of which the respective bases are biased to a fixed voltage, there may be connected in series such devices having a logarithmic voltage characteristic as diodes. The output signal from the logarithmic converter 2 including the differential circuit is fed via the variable gain amplifier 3 to the antilogarithmic converter including the differential circuit. In the operation, manually adjusting the value of the variable resistor 62 to alter the gain of the amplifier 3, there can be attained an output having an arbitrary power characteristic from the antilogarithmic converter 4 including the differential circuit.

Figure 6:
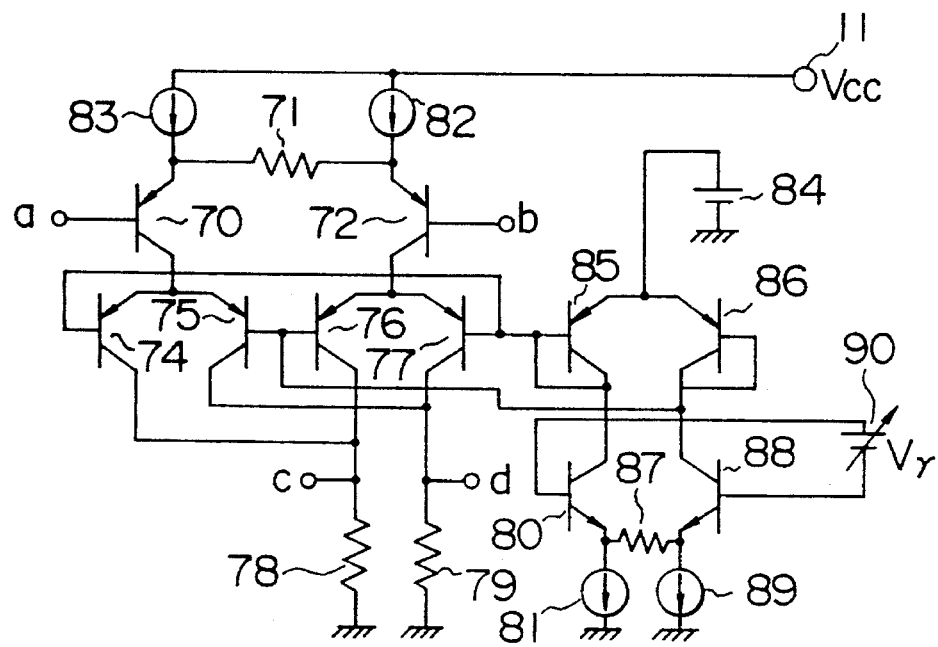
FIG. 6 is a circuit diagram showing an example of a variable gain amplifier of an electronic control type which can be used in place of the variable gain amplifier of FIG. 5.

The gain of the variable gain amplifier 3 shown in FIG. 5 can be altered through the manual adjustment of the resistance value of the variable resistor 62. However, the gain can also be changed by replacing the variable resistor 62 with an electronically controllable impedance element such as an FET, a diode, or a photocoupler. In this fashion, the electronic control of the gain of the variable gain amplifier enables an automatic control of the color corrector. Moreover, the variable gain amplifier may include a multiplier to develop the electronic control of the color corrector. A specific circuit example of the amplifier will be shown in FIG. 6. This is a circuit diagram showing an example of a variable gain amplifier of an electronic control which may be replaced with the variable gain amplifier of FIG. 5. Namely, the variable gain amplifier of the electronic control type shown in FIG. 6 can be used in place of the variable gain amplifier of FIG. 5 by connecting input terminals a and b and output terminals c and d to the terminals respectively assigned with the same reference codes in FIG. 5. The amplifier of FIG. 6 includes a 4-quadrant multiplier circuit including transistors 70, 72, 74, and 77 and transistors 80, 88, 85, and 86 controlling the multiplier circuit. As a voltage $V\gamma$ of a control voltage source 90 is increased, the gain of the amplifier becomes larger. In addition, using pnp-type transistors like the transistors 74 to 77 for the transistors 85 and 86, there is guaranteed integrity in the circuit integration. Moreover, the base current of the transistors 74 to 77 is prevented from flowing into the side of the control circuit, thereby keeping an appropriate control range.

Figure 7:
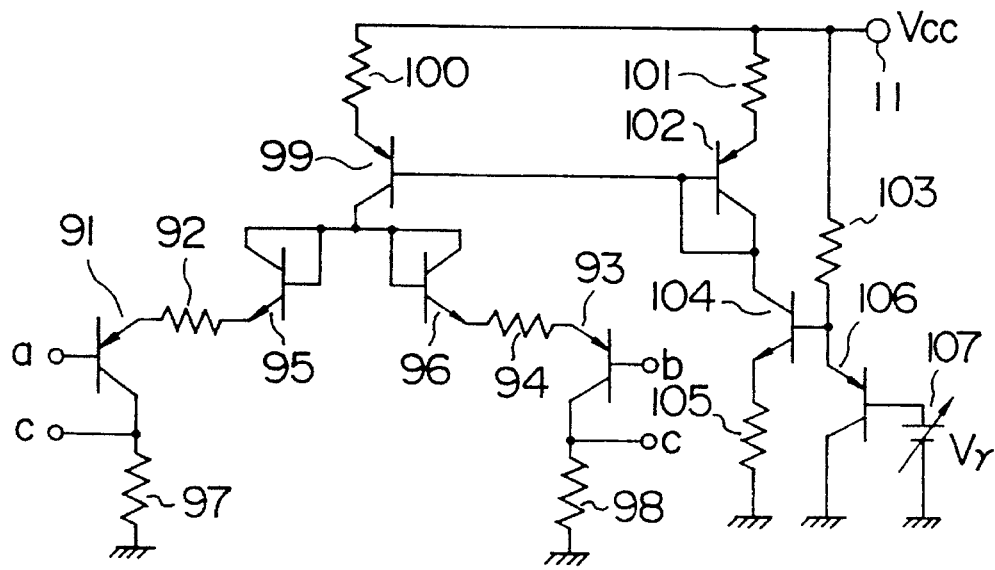
FIG. 7 is a circuit diagram showing another example of the variable gain amplifier of an electronic control type which can be used in place of the variable gain amplifier of FIG. 5.

Furthermore, there is shown in FIG. 7 a specific circuit example of a variable gain amplifier including a diode as an impedance element so as to electronically controlling the gain thereof. FIG. 7 is a circuit diagram showing another example of a variable gain amplifier of an electronic control which may be used in placed of the variable gain amplifier of FIG. 5. In FIG. 7, the operational resistance value of each of the transistors 95 and 96 respectively connected to diodes is controlled by adjusting the bias current supplied to the diodes. The voltage $V\gamma$ of the control voltage source 107 disposed to alter the gain is applied via transistors 106 and 104 to a resistor 105 to conduct the voltage-to-current conversion while suppressing the influence of the temperature drift of the base-emitter voltage of the transistor. The converted current biases the transistors 95 and 96 thus connected to the diodes via the current mirror circuit including transistors 102 and 99. As the voltage $V\gamma$ of the control voltage source 107 become higher, the bias current is increased. In consequence, the operational resistance value of each of the transistors 95 and 96 is lowered and the gain of the variable gain amplifier is increased.

Figure 8:
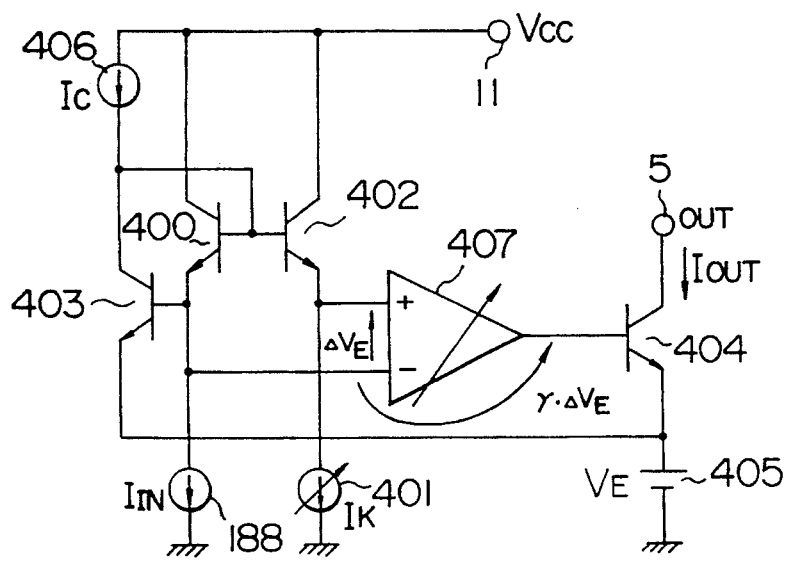
FIG. 8 is a circuit diagram showing a third specific embodiment of the color corrector of FIG. 1.

FIG. 8 is a circuit diagram showing a third specific example of the color corrector shown in FIG. 1. This example has an aspect in which the integrity of the paired transistors is advantageously employed to possibly suppress the temperature dependence. The color corrector of FIG. 8 primarily includes a logarithmic converter 2 including a pair of transistors 400 and 402, a variable gain amplifier 3 including a differential amplifier 407, and an antilogarithmic converter 4 including a pair of transistors 403 and 404. A current $I_{IN}$ from an input signal current source 188 flows into an emitter of the transistor 400 to be subjected to a $\gamma$-th power conversion, thereby producing an output current $I_{OUT}$ from an output terminal 5. The conversion having a favorable stability with respect to temperature is obtained by the integrity of each of the pairs of transistors 400 and 402 as well as 403 and 404. A current $I_K$ from a variable current source 401 flows into an emitter of the transistor 402. Consequently, an intra-emitter voltage $\Delta V_E$ between the transistors 400 and 402 becomes independent of saturation currents of the transistors. Namely, the voltage takes a value proportional to a ratio between the currents $I_{IN}$ and $I_K$ and to the thermal voltage. Moreover, the emitter potential of the transistor 400 becomes equal to the base potential of the transistor 403 to which a negative feedback is effected, i.e., the current from the constant current source 406 is supplied to the corrector of the transistor 403. In this case, the negative feedback loop ranges from the collector of the transistor 403 via the base and emitter of the transistor 400 to the base of the transistor 403. Furthermore, the voltage $\Delta V_E$ is multiplied by $\gamma$ in the differential amplifier 407 to be applied to the base of the transistor 404 having the same emitter potential as the transistor 403. Influences from the thermal voltage is consequently cancelled out and there is obtained an output current $I_{OUT}$ undergone the $\gamma$-th power conversion. In this situation, thanks to the integrity of the transistors 403 and 404, there is attained a voltage-current conversion characteristic which can be approximated to depend only on the thermal voltage and the voltage $\Delta V_E$. However, since the thermal voltage is proportional to the absolute temperature of the emitter junction, the difference between the pairs is ordinarily decreased and hence the temperature dependence is considerably lowered. When the paired transistors are manufactured in an identical chip, the temperature dependence is much more improved. In addition, the gain $\gamma$ of the differential amplifier 407 is readily altered. Also in a case of the variable gain $\gamma$, there is retained the relationship that the output current becomes identical to the current $I_C$ when the input current is equal to the current $I_K$. Furthermore, setting the common emitter potential $V_E$ to 0 volt or a negative voltage, the output dynamic range can also be expanded. In consequence, when the gain $\gamma$, the currents $I_K$ and $I_C$, and the emitter voltage $V_E$ become variable in the color corrector of the specific example, the conversion characteristic and the output dynamic range thereof can be arbitrarily selected. Moreover, connecting the output terminal 5 via an impedance element to a voltage source, a voltage output can be obtained from the color corrector of the specific example. The transistors 400, 402, 403, and 404 may be replaced with elements, for example, diodes and FETs, which have a nonlinear characteristic, namely, a voltage-current characteristic representable by an antilogarithmic function or a logarithmic function.

Figure 9:
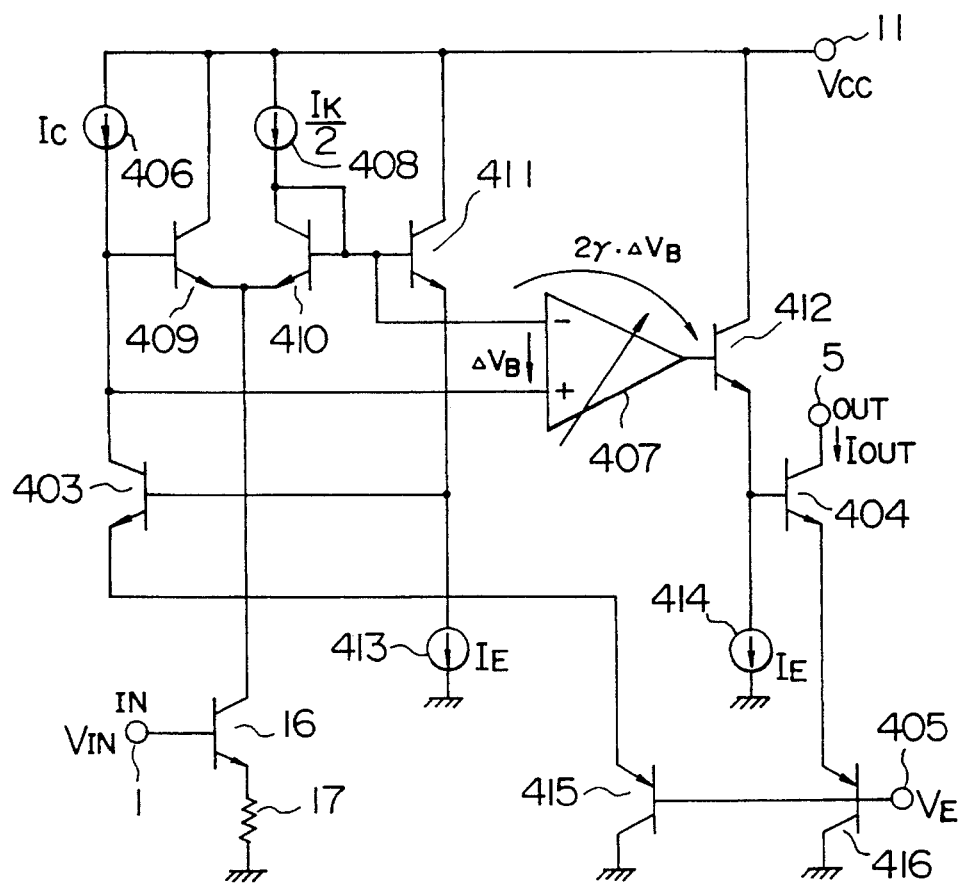
FIG. 9 is a circuit diagram showing a fourth specific embodiment of the color corrector of FIG. 1.

FIG. 9 is a circuit diagram showing a fourth specific example of the color corrector shown in FIG. 1. This example has an aspect that there is used the integrity of the paired transistors constituting the differential pairs to possibly suppress the temperature dependence. The color corrector of FIG. 9 mainly includes a logarithmic converter 2 including a pair of transistors 16 and 409, a variable gain amplifier 3 including a differential amplifier 407, and an antilogarithmic converter 4 including pairs of transistors 403 and 404 as well as 415 and 416. Furthermore, a loop ranging from a collector of the transistor 403 via transistors 409 to 411 to a base of the transistor 403 forms a negative feedback loop to set the collector current of the transistor 403 to Ic. An input voltage $V_{IN}$ from an input terminal 1 is transformed into a current through the transistor 16 and the impedance 17 to be fed to a common emitter terminal of the differential pair of the transistors 409 and 410. The obtained signal is then subjected to the $\gamma$-th power conversion through the paired transistors 403 and 404 to be delivered therefrom as an output current $I_{OUT}$. The principle of cancelling out influences from the thermal voltage and thereby guaranteeing the stability with respect to temperature is the same as for the specific example shown in FIG. 8. Moreover, in a case where the parameter $\gamma$ is variable in the color corrector of the specific example, when the magnitude of the current transformed from the input voltage $V_{IN}$ becomes equal to twice that of the constant current source 408 deciding the corrector current of the transistor 410, there is kept the relationship that the output current is identical to the current Ic. Furthermore, since the emitters respectively of the paired transistors 403 and 404 are connected via the paired transistors 415 and 416 to the terminal 405 having the common emitter potential $V_E$, the voltage source impedance can be set to a high value in the operation to establish the potential $V_E$, thereby increasing the degree of freedom in the circuit designing process. The gain of the differential amplifier 407 has been set to 2γ because the alternate-current (ac) grounding with respect to the common emitter potential is effected via the paired transistors 403 and 404 as well as 415 and 416. In addition, the circuit system is driven by an emitter follower or a common collector amplifier including the transistors 411 and 412, a relatively high output power is attained from the paired transistors 403 and 404. The transistors 409, 410, 403, and 404 may be substituted for elements, for example, diodes and FETs, which have a nonlinear characteristic, namely, a voltage-current characteristic representable by an antilogarithmic function or a logarithmic function.

Figure 10:
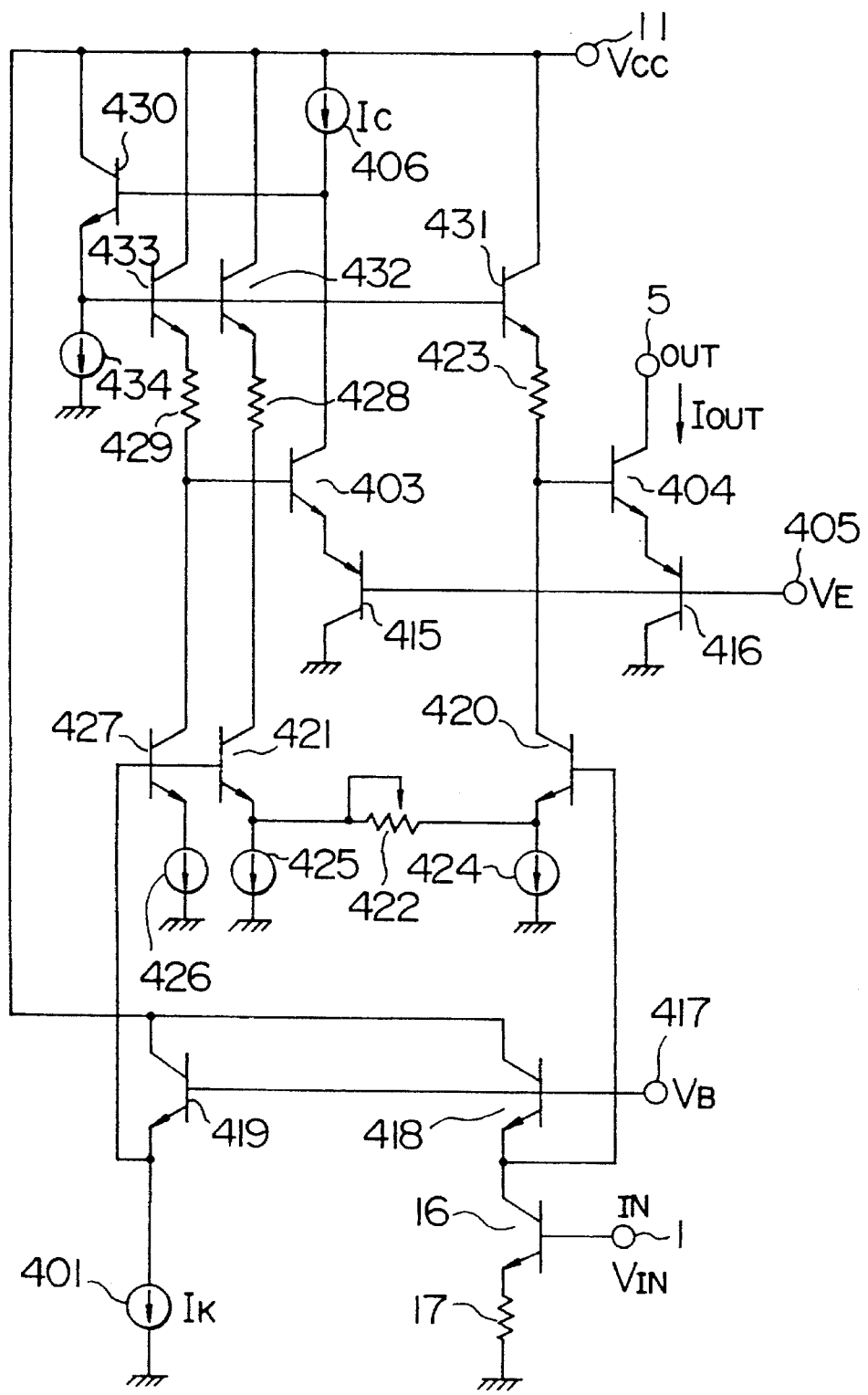
FIG. 10 is a circuit diagram showing a fifth specific embodiment of the color corrector of FIG. 1.

FIG. 10 is a circuit diagram showing a fifth concrete example of the color corrector of FIG. 1. According to an aspect of this example in which the integrity of paired transistors is employed to suppress the temperature dependence, a signal path is not included in the negative feedback loop disposed to set the output reference current so as to increase the operation speed. The color corrector of FIG. 10 includes a logarithmic converter 2 including a pair of transistors 418 and 419, a variable gain amplifier 3 including transistors 420 and 421 and a variable resistor 422, and an antilogarithmic converter including paired transistors 403 and 404 as well as 415 and 416. An Input signal voltage $V_{IN}$ is subjected to a logarithmic conversion through the paired transistors 418 and 419 to be multiplied by γ in the amplifier 3 including the differential circuit constituted with the transistors 420 and 421 so as to supply the resultant signal to the transistor 404. In this configuration, the negative feedback loop which sets the collector current of the transistor 403 includes a loop ranging from the collector of the transistor 403 via transistors 430 and 433 and a resistor 429 to the base of the transistor 403. Namely, the loop is separated from a signal path including the transistors 420 and 404 and the resistor 423. With provision of the circuit construction, the signal frequency band and the response speed can be satisfactorily guaranteed without any restriction from the stability condition of the negative feedback loop. In this regard, to improve precision of setting collector currents of the transistors 403 and 404, the constant current sources 424 and 426 and the resistors 423 and 429 are set to an identical current value and an identical resistance value, respectively. It is to be understood that the gain of the variable gain amplifier 3 can be altered according to the resistance value of the variable resistor 422.

Figure 11:
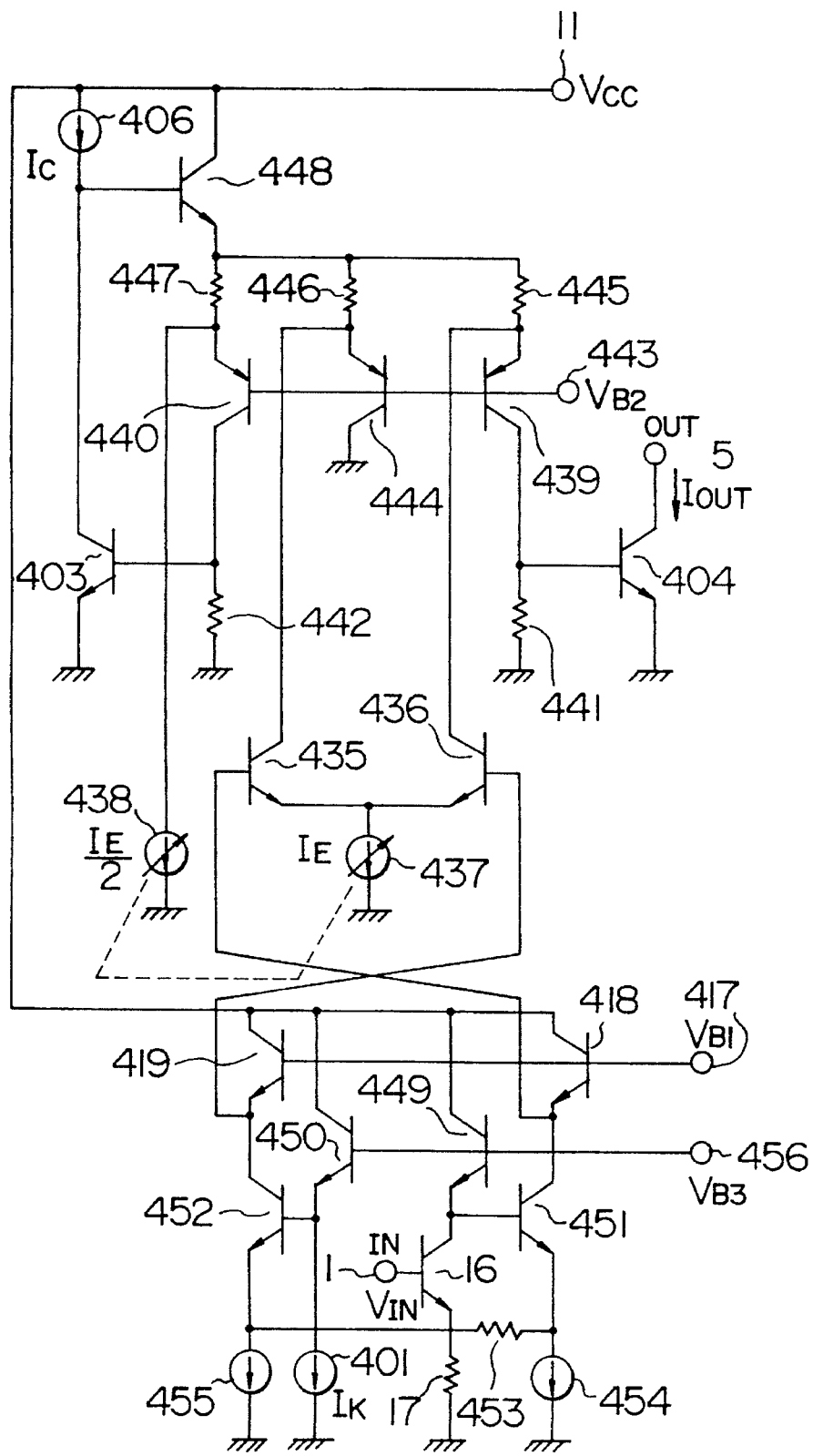
FIG. 11 is a circuit diagram showing a sixth specific embodiment of the color corrector of FIG. 1.

FIG. 11 is a circuit diagram of a sixth specific example of the color corrector shown in FIG. 1. According to an aspect of this example in which the integrity of paired transistors is utilized to suppress the temperature dependence and a signal path is separated from the negative feedback loop disposed to set the output reference current so as to increase the operation speed. The characteristic of the circuit system can be controlled according to the voltage and current. The color corrector of FIG. 11 includes a logarithmic converter 2 including a pair of transistors 449 and 450, a variable gain amplifier 3 including transistors 451 and 452, paired transistors 418 and 419 as well as 435 and 436, and a variable current source 437, and an antilogarithmic converter including transistors 403 and 404. An Input signal voltage $V_{IN}$ is subjected to a logarithmic compression through the paired transistors 449 and 450 to be multiplied by γ in the amplifier 3 including the differential circuit constituted with the transistors 451 and 452, the paired transistors 418 and 419 as well as 435 and 436, and the variable current source 437. The resultant signal is fed to the transistor 404. In this construction, in operation of the variable gain amplifier, the ratio between emitter currents respectively of the paired transistors 418 and 419 is equal to that between the collector currents respectively of the paired transistors 435 and 436. In consequence, the gain takes a larger value when the current $I_E$ of the variable current source 437 is increased. Moreover, the signal current flowing into the collector of the transistor 436 is fed via a grounded-base transistor 439 to an impedance 441 so as to be transformed into a voltage signal. The obtained signal is applied to the transistor 404. In this operation, to improve precision of setting collector currents of the transistors 439 and 440, a constant current sources 438 connected to the emitter of a transistor 440 is set to $I_E/2$ in cooperation with the variable current source 437. The negative feedback loop which sets the collector current of the transistor 403 to Ic includes a loop ranging from the collector of the transistor 403 via a transistor 448, a resistor 4447, and the transistor 440 to the base of the transistor 403. Namely, the loop is separated from a signal path including the 436 and 439 and the resistor 445. Moreover, also connected to the collector of the transistor 435 are a transistor 444 and a resistor 446 to cancel out a small signal current flowing into the emitter of the transistor 448. This further guarantees separation between the negative feedback loop and the signal path. It is to be appreciated that the section of the variable gain amplifier 3 can be replaced with any one of the variable gain amplifiers of the electronic control type shown in FIGS. 6 and 7, respectively.

Figure 12:
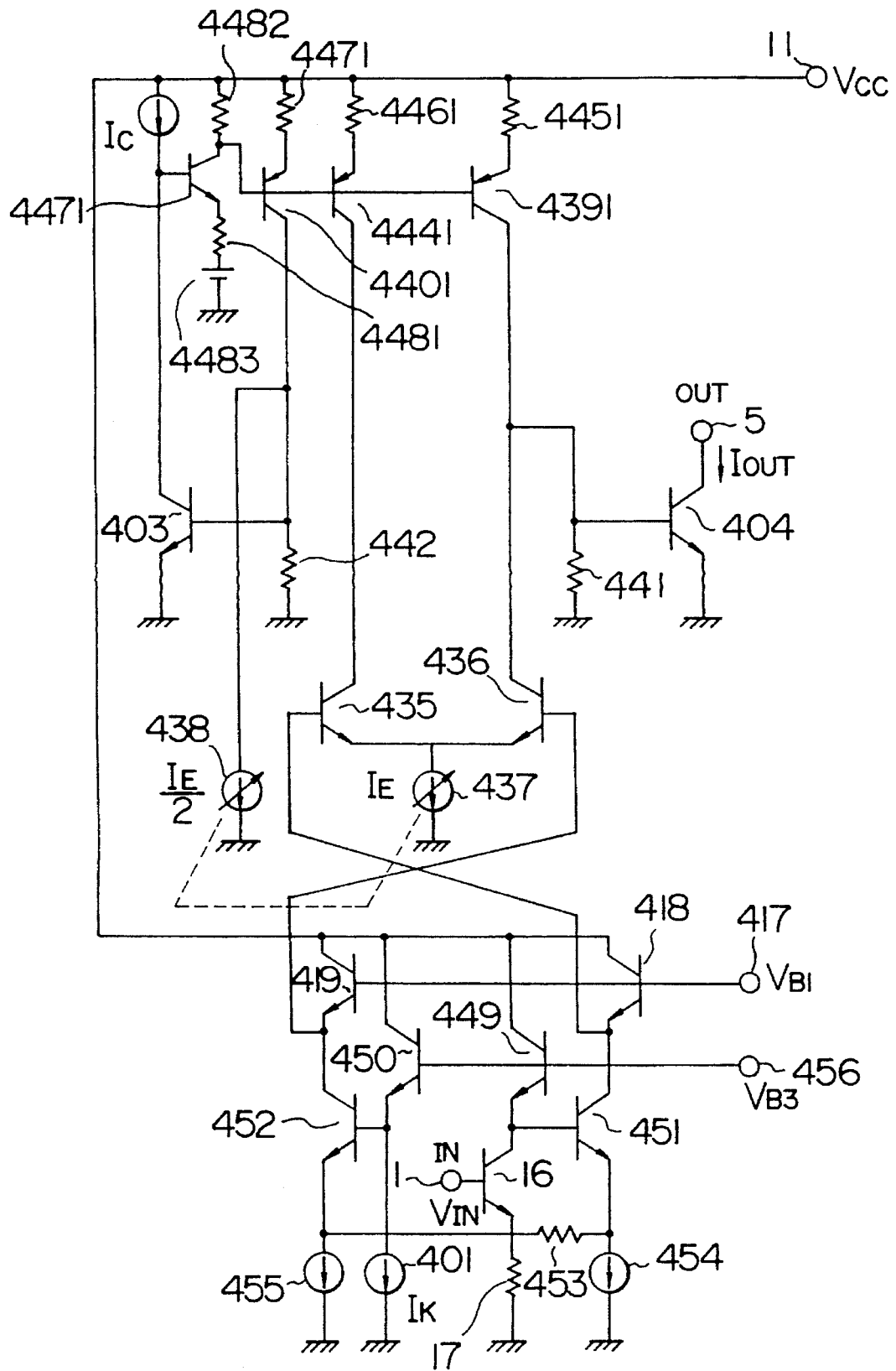
FIG. 12 is a circuit diagram showing an embodiment in which resistors 445 to 447 of the color corrector of FIG. 11 are replaced with variable current source circuits, respectively.

In addition, each of the resistors 445 to 447 respectively connected to the transistors 439, 444, and 440 of FIG. 11 can be substituted for a variable current source circuit supplying a one-directional current. Thanks to the variable current source circuit, it is possible to suppress distortion due to the operational resistance of the emitter of each of the transistors 439, 444, and 440. Namely, according to the current division ratio of the operational resistance of each of the transistors 439, 444, and 440, portions of the signal current are leaked out. In the operation, the values of the operational resistance respectively of the emitters of the transistors 439, 444, and 440 are changed in accordance with the values respectively of the emitter current values respectively of the transistors 439, 444, and 440. Consequently, the current division ratio is also varied according to the values respectively of the emitter current values respectively of the transistors 439, 444, and 440, which leads to the distortion. In this situation, when the resistors 445 to 447 are replaced respectively with variable current source circuits, the current division ratio of signal currents to the emitters of the transistors 439, 444, and 440 becomes substantially equal to one, thereby suppressing the distortion. FIG. 12 shows a specific circuit example in which the variable current source circuits are adopted in place of the resistors. Namely, the configuration of FIG. 12 is obtained by substituting the resistors 445 to 447 of the color corrector of FIG. 11 for variable current source circuits, respectively. That is, transistors 4391, 4441, and 4401 form a current source circuit such that the current value thereof is controlled by a grounded-emitter transistor 4471. In this circuit structure, the control characteristic of the current value of the current source circuit is decided by a voltage bias source 4483 and resistors 4481, 4482, 4471, 4461, and 4451. In this regard, there may be formed a short circuit to delete the voltage bias source 4483.

Figure 13:
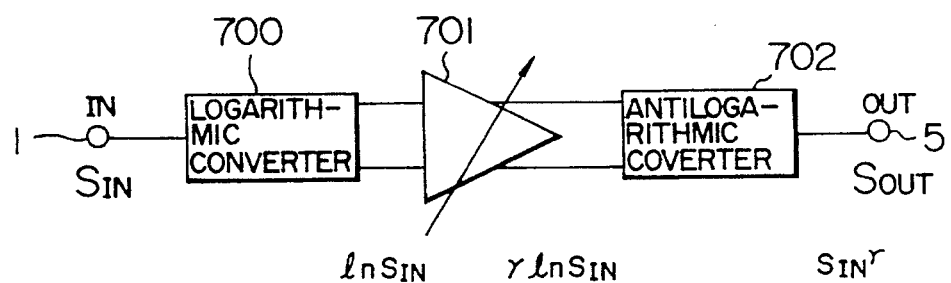
FIG. 13 is a block diagram showing a color corrector in a second embodiment according to the present invention.

FIG. 13 shows in a block diagram a color corrector in a second embodiment according to the present invention in which a differential transmission of signals is employed to develop a high-speed wide-band operation with a high precision in a minimized configuration. As can be seen from FIG. 13, the color corrector of this embodiment includes a series connection of a logarithmic converter 700, a variable gain amplifier 701, and an antilogarithmic converter 702. The corrector can be operated with voltage and current signals. In FIG. 13, an input signal SIN applied to an input terminal 1 of the corrector is subjected to a logarithmic conversion through the logarithmic converter 700 to be outputted in a differential manner as a differential input signal to the amplifier 701. The signal is multiplied by γ therein to be outputted in a differential manner as a differential input signal to the antilogarithmic converter 702. The signal is then subjected to an antilogarithmic conversion and then to a γ-th power conversion to be outputted from an output terminal 5. Thanks to the differential signal transmission, it is possible to remove the noise associated with the in-phase superimposition of signals on the signal line so as to further improve precision of the conversion characteristic. Moreover, there can be unnecessitated the negative feedback loop which has been required for a high-precision transmission of a signal having a small amplitude after the logarithmic conversion. Thanks to absence of the negative feedback loop, the configuration of the circuit can be minimized; moreover, restriction imposed due to the stability of feedback on the operation speed and the operation band can be removed to develop a high-speed wide-band operation. In addition, it is to be appreciated that the gain γ of the variable gain amplifier 701 need not be variable to obtain the advantageous effect of the embodiment only if the gain γ is fixed to the value specified by the designer. Furthermore, the present invention is not restricted by the color corrector but is naturally applicable to a converter having a power characteristic which can be broadly used in the general signal processing.

Figure 14A:
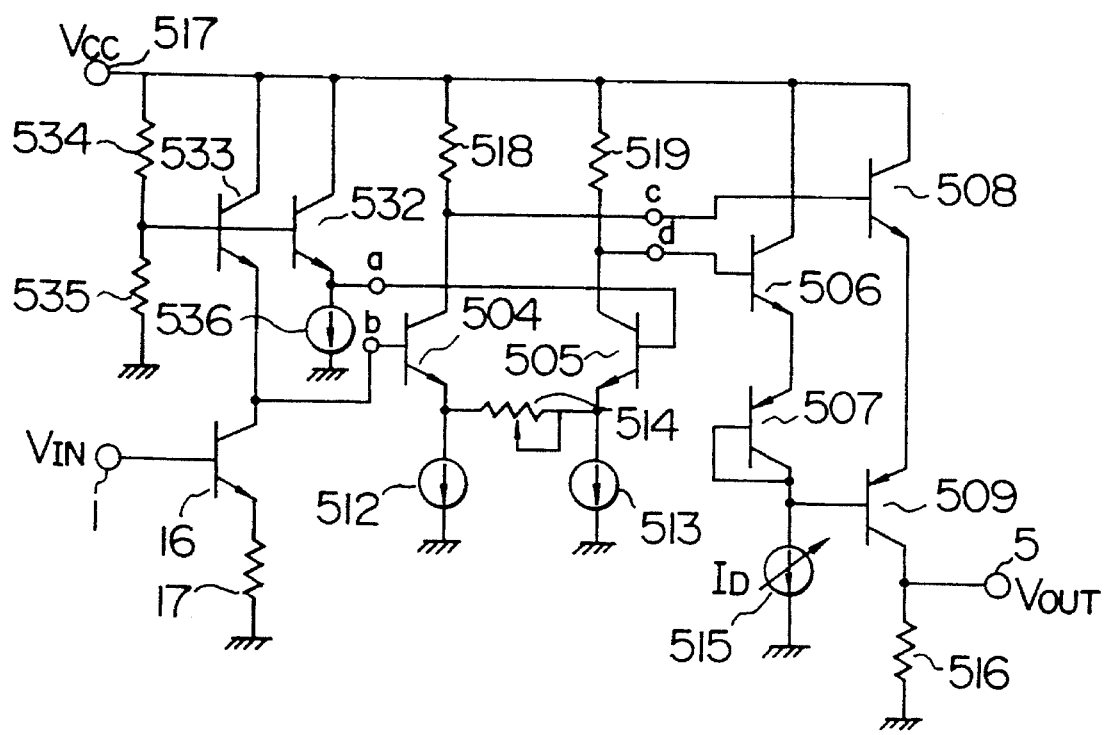
FIGS. 14A and 14B are circuit diagrams showing a first specific embodiment of the color corrector shown in FIG. 13.

FIG. 14A shows in a circuit diagram a first specific embodiment of the color corrector shown in FIG. 13. According to an aspect of the embodiment, a signal transmission path from a logarithmic converter via a variable gain amplifier to an antilogarithmic converter is configured in a differential structure to reduce the circuit configuration and to conduct a high-speed wideband operation. Moreover, it is possible to transfer a small signal with a high stability in a range from an output of the logarithmic converter to an input of the antilogarithmic converter. The color corrector of FIG. 14A primarily includes a logarithmic converter 700 including transistors 532 and 533, a variable gain amplifier 701 including transistors 504 and 505 and a variable resistor 514, and an antilogarithmic converter 702 including transistors 506 and 508 as well as 507 and 509. An input voltage VIN from an input terminal 1 is transformed into a current through a transistor 16 and an impedance element 17 to be subjected to a logarithmic conversion through the transistors 532 and 533, thereby producing a differential voltage between emitters respectively of the transistors 532 and 533. In the variable gain amplifier including the transistors 504 and 505, the voltage is multiplied by a differential gain 2γ determined by resistance values respectively of the resistors 518 and 519 and the variable resistor 514. The resultant signal is applied between bases respectively of the transistors 506 and 508. Through the transistors 506 and 508 as well as 507 and 509, the amplified voltage of the differential signal is subjected to an antilogarithmic conversion into a signal current, which flows into a collector of the transistor 509. The signal current is transformed into a voltage through an impedance 516 so as to obtain from an output terminal 5 an output voltage $V_{OUT}$ undergone a γ-th power conversion. In this way, thanks to the differential configuration of the signal transmission path from the output of the logarithmic converter to the input of the antilogarithmic converter, it is possible, for example, to remove the negative feedback loop deciding the output reference current shown in FIGS. 10 and 11. Accordingly, there can be guaranteed a sufficient signal frequency band and a high response speed. Moreover, it is possible to transfer a small signal with a high stability in a range from the output of the logarithmic converter to the input of the antilogarithmic converter. In addition, when a current $I_D$ from a variable current source 515 is variable, there can be attained a variable amplitude for the output voltage $V_{OUT}$. That is, the embodiment leads to a drive adjustment, which will be described later in conjunction with FIG. 29. Moreover, it is to be understood that when pnp-type transistors are employed as the transistors 504 and 505 constituting the variable gain amplifier, the similar advantageous effect is obtained also in a circuit configuration in which the polarity of each of the current sources 512 and 513 and the voltage source is reversed. Furthermore, additionally connecting a grounded-base transistor to each of the transistors 504 and 505, the variable gain amplifier is configured as a differential circuit in a cascode structure, thereby much more increasing the frequency band and the response speed. It is to be appreciated that according to the resistance value of the variable resistor 514, the gain of the variable gain amplifier can be altered to obtain a desired value of the parameter γ. In this regard, the section of the variable gain amplifier can be replaced by use of the terminals a to d with the variable gain amplifier of the electronic control type shown in FIGS. 6 and 7. Furthermore, using pairs of transistors having integrity for the paired transistors 532 and 533, 504 and 505, 506 and 508, and 507 and 509, there can be suppressed the dc offset voltage appearing after the logarithmic conversion. Consequently, according to the current ID set in the variable current source 515, it is possible to set an appropriate output amplitude so as to improve precision of the γ-th power conversion. In addition, when each or some of the paired transistors is or are fabricated in an identical chip or arranged to be tightly adjacent to each other, an equal pn junction temperature is assumed in each of the paired transistors. In consequence, the drift of the conversion characteristic with respect to temperature is much more suppressed and the precision is further improved. It is accordingly natural that the embodiment is suitable for an integrated circuit in which all transistors are fabricated in a chip. Moreover, according to the embodiment, the current sources 536 and 515 are employed as the current sources of the reference currents for the logarithmic and antilogarithmic converters, respectively. However, when the deviation of the voltage applied to each of these current sources is within a desired range of precision, these current sources can be naturally substituted for resistors. Also, it is to be understood that the variable current sources 515 and 536 may be replaced with variable resistors or fixed resistors having resistance values stipulated in the designing process. Similarly, the variable resistor 514 and the current sources 512 and 513 constituting the variable gain amplifier may be naturally replaced with fixed resistors.

Figure 14B:
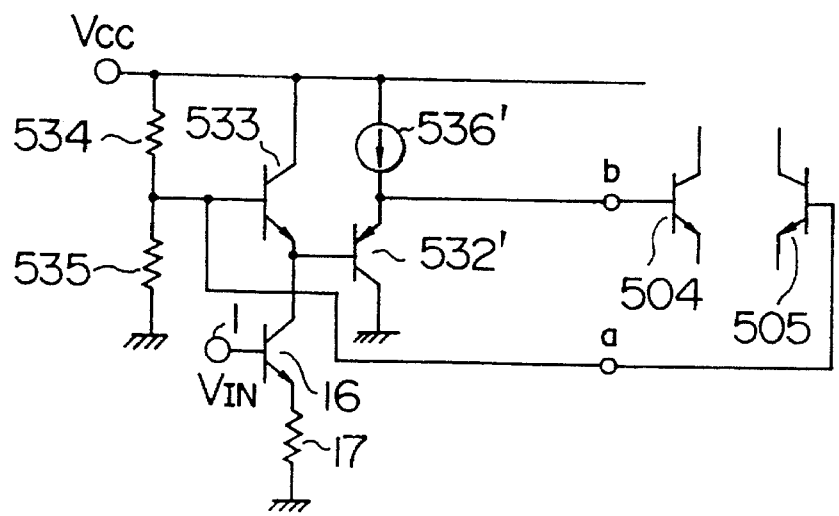

The configuration of the logarithmic converter of FIG. 14A may be substituted for the circuit configuration of FIG. 14B. In FIG. 14B, in place of a transistor 532' connected to a reference current source 536' there may be employed an element having a polarity opposite to that of the transistor 533.

Figure 15:
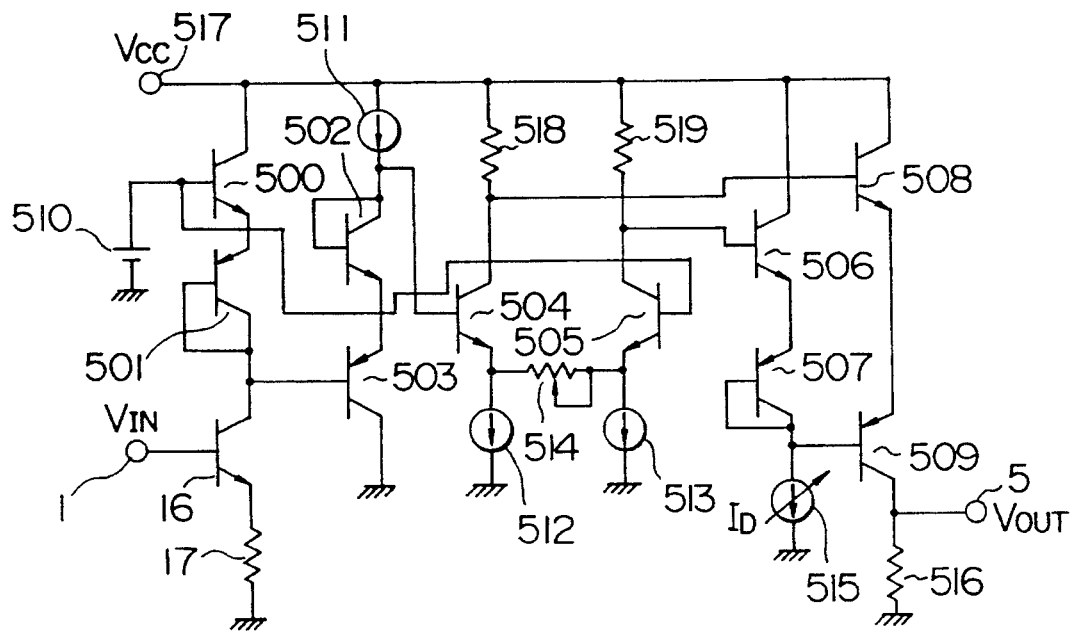
FIG. 15 is a circuit diagram showing a second specific embodiment of the color corrector shown in FIG. 13.

FIG. 15 shows in a circuit diagram of a second specific embodiment of the color corrector shown in FIG. 13. According to an aspect of the embodiment having the aspect of the embodiment of FIG. 14A, even when the differential gain γ of the variable gain amplifier, namely, the power γ of the characteristic is set as γ≦1, a satisfactory dynamic range can be guaranteed for the output signal. The color corrector of FIG. 15 mainly includes a logarithmic converter including transistor pairs 500 and 502 as well as 501 and 503, a variable gain amplifier including transistors 504 and 505 and a variable gain resistor 514, and an antilogarithmic converter including transistor pairs 506 and 508 as well as 507 and 509. An input voltage $V_{IN}$ from an input terminal 1 is converted into a current through a transistor 16 and an impedance 17 to be subjected to a logarithmic conversion through the transistors 500 and 501. The attained signal is then subjected to a level shift through the transistors 502 and 503 to be developed as a differential voltage between bases respectively of the transistors 500 and 502. In the variable gain amplifier including a differential circuit. constituted with the transistors 504 and 505, the resultant voltage signal is amplified by the differential gain γ determined by the resistance values of the resistors 518 and 519 and the variable resistor 514 to be applied between bases respectively of the transistors 506 and 508. The differential signal voltage thus amplified is subjected to an antilogarithmic conversion through the transistors 506 and 508 as well as 507 and 509 to be a signal current flowing into a collector of the transistor 509. The signal is then converted by an impedance 516 into a signal to be delivered from an output terminal 5 as an output voltage $V_{OUT}$ undergone the γ-th power conversion. According to the configuration, when the collector current of the transistor 16 is small, namely, the current flowing through each of the transistors 500 and 501 is small, the base-emitter current of the transistors 500 and 501 approaches exactly to zero, thereby enhancing blockage or interruption of the transistors 500 and 501. As a result, according to the embodiment, even when the parameter γ of the power characteristic of the conversion is set as γ≦1, there can be suppressed the reduction in the output amplitude from the logarithmic converter due to the base current of the input transistors 504 and 505 of the variable gain amplifier. Consequently, a sufficient dynamic range can be reserved for each output signal appearing after the output port of the logarithmic converter. In this constitution, the voltage source 510 can be replaced with a resistance-type potential divider. Thanks to the internal impedance of the voltage source 510, even when the base voltage of the transistor 500 is varied, there occurs in a subsequent stage a common mode rejection in the differential variable gain amplifier or the antilogarithmic converter of the differential input type, and hence the γ-th power conversion characteristic can be guaranteed. In addition, the similar advantageous effect is attainable by a circuit configuration developed by using, in the color corrector of FIG. 14, pnp-type transistors for the transistors 504 and 505 constituting the variable gain amplifier and the polarity is reversed for the current sources 512 and 513 and the power source. That is, the base current of the transistor 504 flows in a direction to enhance interruption of the transistor 533, which consequently prevents the reduction in the output amplitude of the logarithmic converter. Moreover, using a pair of transistors having integrity with respect to characteristics thereof for the transistors 500 and 502, 501 and 503, 504 and 505, 506 and 508, and 507 and 509, there can be exactly set an output amplitude according to adjustment of the current ID of the variable current source 515, thereby improving precision of the γ-th power conversion. Furthermore, when each or some of the pairs of transistors is or are manufactured on an identical chip or arranged to be tightly adjacent to each other, there can be attained substantially an identical pn junction temperature for the paired transistors. This suppresses the drift in the conversion characteristic due to temperature and hence much more improves the conversion precision. It is consequently to be understood that the embodiment is suitable for an integrated circuit in which all transistors are fabricated in a chip.

Figure 16:
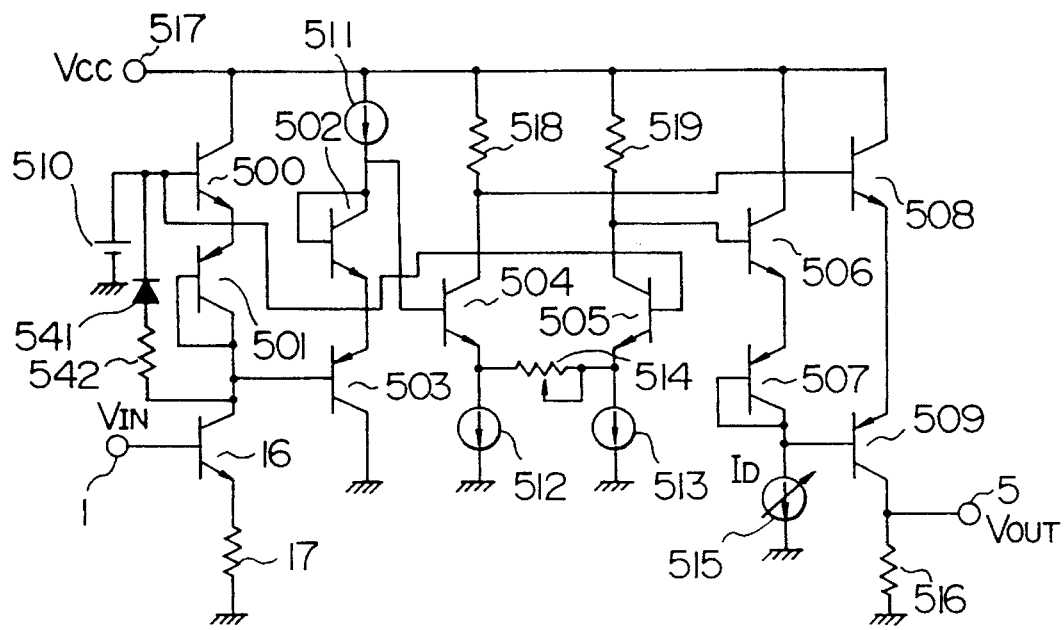
FIG. 16 is a circuit diagram showing a third specific embodiment of the color corrector of FIG. 13.

FIG. 16 is a circuit diagram of a color corrector in a third embodiment according to the present invention in which the transistors are kept protected even when a signal having a large amplitude is supplied as the input voltage $V_{IN}$. The color corrector of FIG. 16 is constructed on the basis of the embodiment shown in FIG. 15. Namely, only a diode 541 or a series connection of the diode 541 and a resistor 542 is connected as a protection circuit between the base terminals respectively of the transistors 501 and 500. In the color corrector of FIG. 15, when a signal having a large amplitude is supplied to the input terminal 1 and the transistor is resultantly interrupted, the base current of the transistor 503 flows into a connecting region between the base and the collector of the transistor 501. This increases the base terminal voltage of the transistor 501 to a value similar to the power source voltage Vcc and hence may possibly destroy the transistor 500. To cope with the difficulty, according to the color corrector of FIG. 16, a protective circuit including only a diode 541 or a series connection of the diode 541 and a resistor 542 is connected in parallel to a point between the base terminals respectively of the transistors 501 and 500. Accordingly, when the base terminal voltage of the transistor 503 becomes higher than that of the transistor 500, the diode 536 is set to a conductive sate, thereby preventing a voltage equal to or more than the reverse breakdown voltage from being applied between the base and the emitter of at least one of the transistors 500 and 501. In this regard, due to the diode 541, the parasitic capacitance of the collector terminal of the transistor 16 is increased and hence the time constant becomes greater in the pertinent section. Consequently, there is disposed the resistor 542 to prevent the increase and thereby to keep the characteristic of the high-speed wide-range conversion. Moreover, it is to be appreciated that an area saving element in an integration circuit such as a Schottky barrier diode or a Zenner diode can be used for the diode 541.

Figure 17:
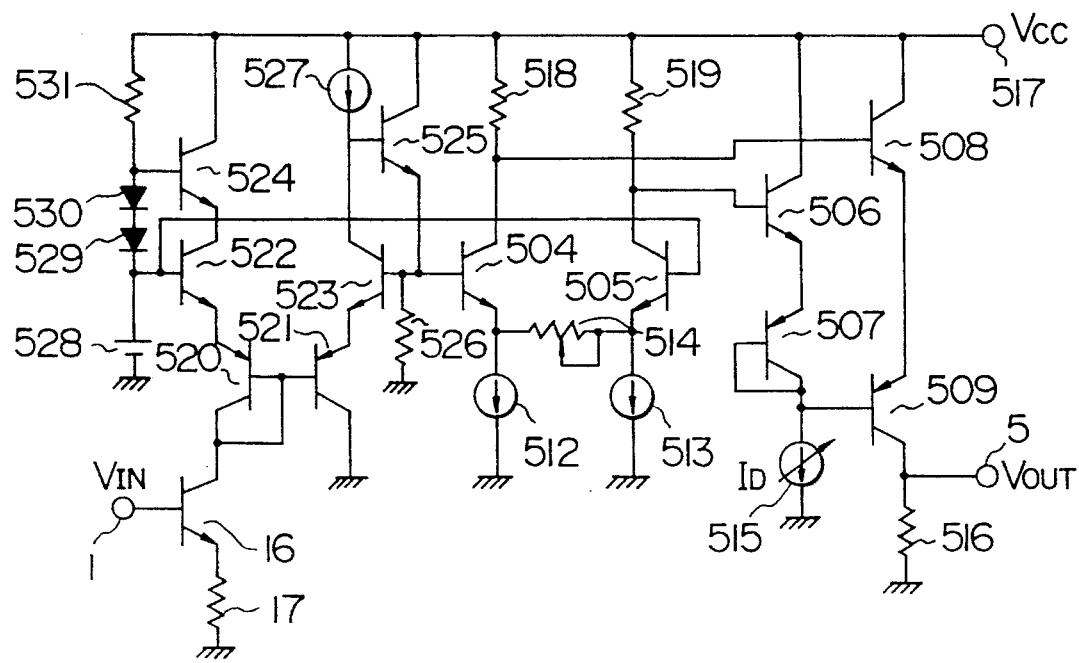
FIG. 17 is a circuit diagram showing a fourth specific embodiment of the color corrector shown in FIG. 13.

FIG. 17 is a circuit diagram showing a fourth specific embodiment of the color corrector of FIG. 13. According to an aspect of the embodiment having the aspect of that shown in FIG. 15, there is suppressed a deviation in the output voltage at a dc operation point which may take place when the gain γ of the variable gain amplifier, namely, the γ-th power of the conversion characteristic for the conversion is changed. The color corrector of FIG. 17 includes a logarithmic converter 700 including transistors 520 and 521 as well as 522 and 523, a variable gain amplifier including transistors 504 and 505 and a variable resistor 514, and an antilogarithmic converter including transistors 506 and 508 as well as 507 and 509. An input voltage VIN from an input terminal 1 is transformed into a current through the transistors 522 and 520. The current signal is passed via the transistors 523 and 521 to be obtained as a differential voltage between the bases respectively of the transistors 522 and 523. In the variable gain amplifier including a differential circuit configured with the transistors 504 and 505, the signal is amplified by a differential gain γ decided by the resistance values of resistors 518 and 519 and the variable resistor 514 to be applied between the bases of the transistors 506 and 508, respectively. Through the transistors 506 and 508 as well as 507 and 509, the amplified voltage of the differential signal is subjected to an antilogarithmic conversion to be a collector current of the transistor 509. The current signal is transformed by an impedance 516 into a voltage to be outputted from an output terminal 5 as an output voltage $V_{OUT}$ undergone the γ-th power conversion. When the base-collector voltage of the transistor 522 set by diodes 529 and 530 and a transistor 524 is substantially equal to that of the transistor 523 set by a transistor 525, the collector loss of the transistor 522 becomes similar to that of the transistor 523, thereby suppressing the variation in the output voltage at the dc operation point which possibly appears when the gain γ of the variable gain amplifier, namely, the γ-th power of the conversion characteristic for the conversion is changed. The variation is caused as follows. Since the collector loss considerably varies between the transistors constituting the logarithmic converter, there occurs a dc offset in the differential output of the logarithmic converter. The offset changes in relation to the variation in the gain γ of the variable gain amplifier, which leads to the amplitude variation after the antilogarithmic conversion. The amplitude variation leads to an alteration of the dc operation point existing at a point, regardless of the value of γ, in association with the output from the antilogarithmic converter. Furthermore, employing a pair of transistors, namely, paired transistors for the transistors 524 and 525, 522 and 523, 520 and 521, 504 and 505, 506 and 508, and 507 and 509, the output amplitude can be exactly established through adjustment of a current ID of a variable current source 515, which improves precision of the γ-th power conversion. In addition, when each or a plurality of the pairs of transistors is or are formed in a chip or arranged to be closely adjacent to each other, there can be developed substantially the same pn junction temperature for the paired transistors, thereby suppressing the drift in the conversion characteristic due to temperature and further improving the conversion precision. Namely, it is to be appreciated that the embodiment is suitable for an integrated circuit. Moreover, according to the embodiment, to establish the base-collector voltage of the transistor 522, there are adopted the diodes 529 and 530 and the transistor 524. However, in place of the diodes 529 and 530, there may naturally be utilized resistors. Furthermore, since the transistor 525 configures an emitter follower circuit, there is attained an advantage that even when there is required a long connection wire to the variable gain amplifier in the subsequent stage, the output impedance is lowered to thereby send signals with a satisfactory stability.

Figure 18:
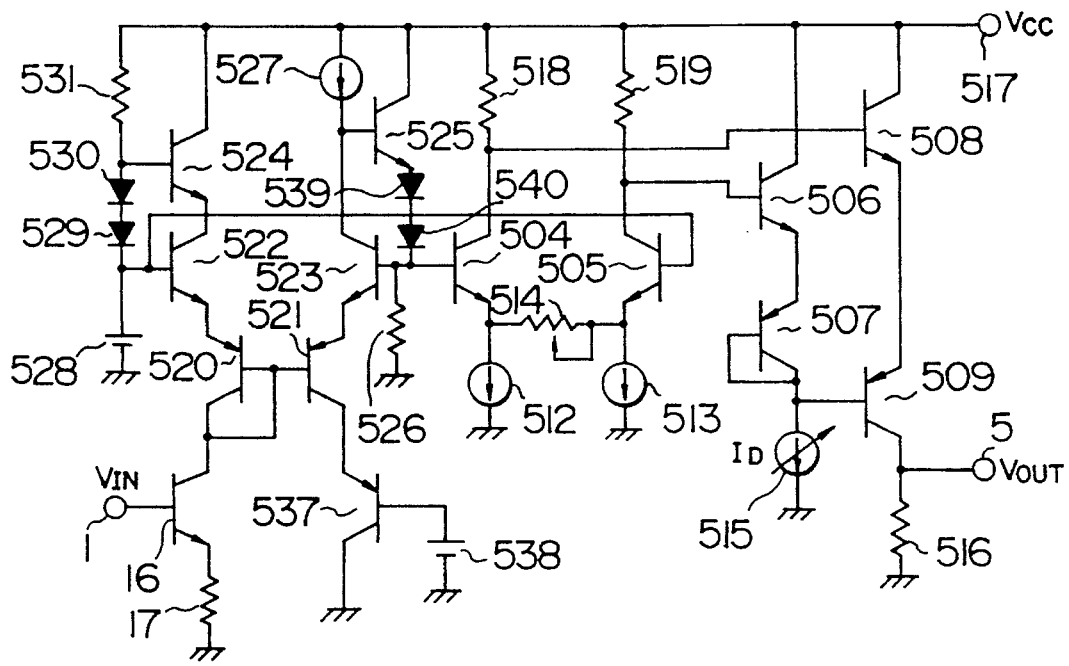
FIG. 18 is a circuit diagram showing a fifth specific embodiment of the color corrector of FIG. 13.

FIG. 18 shows a fifth specific embodiment of the color corrector in which the stability of the output voltage at the dc operation point is more improved in a case where the gain γ of the variable gain amplifier, namely, the γ-th power of the conversion characteristic for the conversion is changed. In the structure of the color corrector of FIG. 18, diodes 539 and 540 are connected between a base terminal of a transistor 523 and an emitter terminal of a transistor 525, and a collector terminal of a transistor 521 is connected to an emitter terminal of a transistor 537. Thanks to the constitution, even when a current source 527 has a small current value, discrepancy between collector losses respectively of transistors 522 and 523 can be minimized by setting a collector-emitter voltage of the transistor 523 to be higher than the voltage of the transistor 523. Moreover, an emitter-collector voltage of the transistor 521 can be lowered by setting an emitter potential of a transistor 534 to an appropriate value to reduce discrepancy between collector losses of the transistors 520 and 521, respectively. This further improves the stability of the output voltage at the dc operation point when the gain γ of the variable gain amplifier, namely, the γ-th power of the conversion characteristic for the conversion is changed. In this embodiment, the diodes 539 and 540 are connected between the base terminal of the transistor 523 and the emitter terminal of the transistor 525. However, the similar advantage is naturally attained when resistors are used in place of the diodes. Furthermore, to obtain the same advantageous effect, in place of the transistors 537 connected to the collector terminal of the transistor 521, there may be employed a resistor with its another terminal connected to a low-impedance point such as the grounding point.

Figure 19:
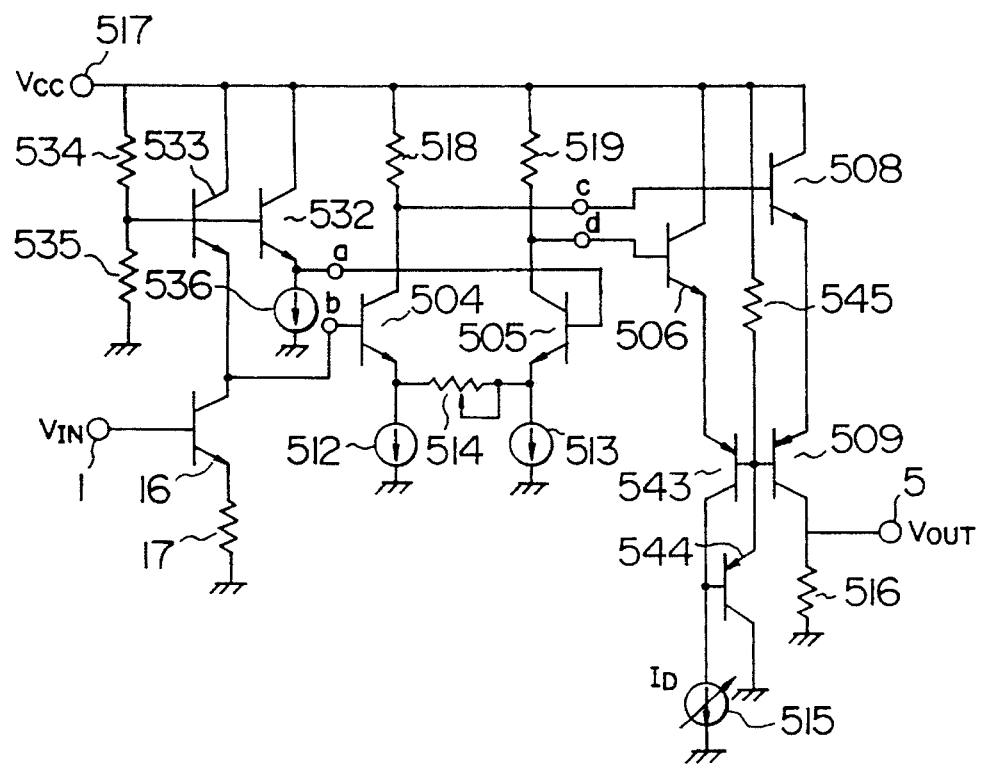
FIG. 19 is a circuit diagram showing a sixth specific embodiment of the color corrector shown in FIG. 13.

FIG. 19 shows in a circuit diagram a sixth embodiment of the antilogarithmic converter shown in FIGS. 14A and 14B and FIGS. 15 to 18 in which the frequency band and the response speed are increased. In FIG. 19, the logarithmic converter and the variable gain amplifier are the same as those of FIG. 14 and hence the operation principle is identical to that described above. A signal multiplied by the differential gain γ in the variable gain amplifier is applied between bases respectively of transistors 506 and 508. Through the transistors 506 and 508 and 543 and 509, the amplified voltage of the differential signal is subjected to an antilogarithmic conversion to be a collector current of the transistor 509. The signal is then transformed by an impedance element 516 into a voltage to be delivered from an output terminal 5 as an output signal $V_{OUT}$ undergone the γ-th power conversion. Thanks to an action of a negative feedback loop ranging from a collector terminal of the transistor 543 via a base terminal of a transistor 544 and an emitter terminal thereof to a base terminal of the transistor 543 and a buffering action of the transistor 544 constituting an emitter-follower circuit, it is possible to minimize the actual time constant appearing in the base terminal of the transistor 544. This resultantly expands the frequency band and the response speed of the antilogarithmic converter.

In this connection, it is to be appreciated that bipolar transistors constituting the logarithmic and antilogarithmic converters in each of the embodiments shown in FIGS. 4 to 19 can be substituted for devices such as MOSFETs (sub-threshold region) having an operational region developing a similar power and logarithm characteristics in relation to the voltage-current conversion.

Figure 20:
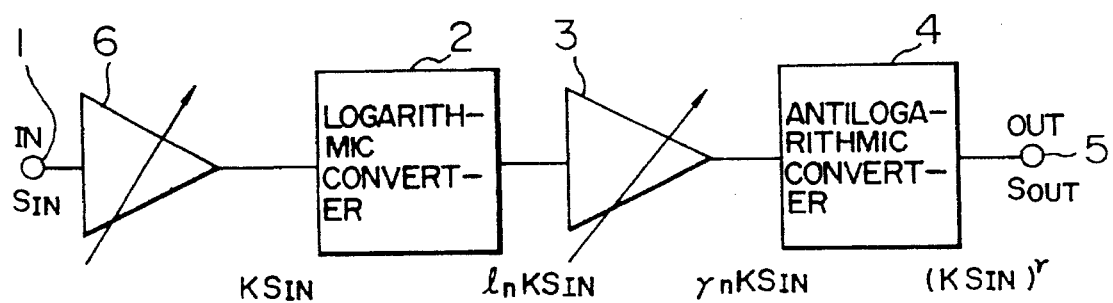
FIG. 20 is a block diagram showing a color corrector in a third embodiment according to the present invention.
Figure 21:
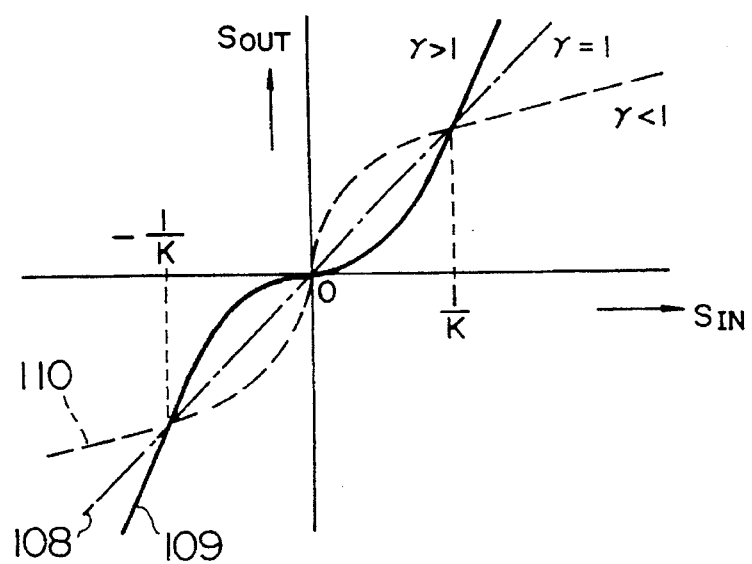
FIG. 21 is a characteristic graph showing input/output characteristics of the color corrector shown in FIG. 20.

In each color corrector described above, when the input signal $S_{IN}$ takes a value "1" in the input port of the logarithmic converter 2, there is obtained a fixed output which is not influenced from the parameter γ. In a system including the color corrector, the input/output operation point independent of the parameter γ is effectively used as another characteristic adjusting point. In consequence, to sufficiently expand the application field of the color corrector, a fixed output independent of the parameter γ is required to be obtained for any value of the input signal $S_{IN}$. In this connection, description will be given of an embodiment of the color corrector. In this configuration, to convert the signal amplitude into an appropriate value, there is arranged an amplifier, an attenuator, or a variable gain amplifier in a first stage. This enables the color corrector to be applied to video apparatuses in a wide range. FIG. 20 shows in a block diagram a color corrector in a third embodiment according to the present invention. The configuration of FIG. 20 includes, in addition to the constitution of FIG. 1, a signal amplitude adjuster 6 in a first stage thereof. Description will now be given of operation of the color corrector of the embodiment. FIG. 21 is a graph showing input-output characteristics of the color corrector shown in FIG. 20. In the graph of FIG. 21, the input $S_{IN}$ and the output $S_{OUT}$ of the color corrector are respectively represented by the ordinate and the abscissa and the adjusting parameter is expressed as γ. In the case of the embodiment, assuming the gain of the signal amplification adjuster 6 to be K, when $KS_{IN}$ as the input signal to the logarithmic converter 2 takes a value "1" there is attained a fixed output 1γ independent of the parameter γ. Consequently, as shown in FIG. 21, when the input $S_{IN}$ is 1/K, the output value $S_{OUT}$ is fixed independently of the parameter γ. Like in the circuit of FIG. 5 capable of processing input and output signals in the differential format, the input and output operation points are similarly fixed when the input $S_{IN}$ is −1/K as shown in FIG. 21.

Figure 22:
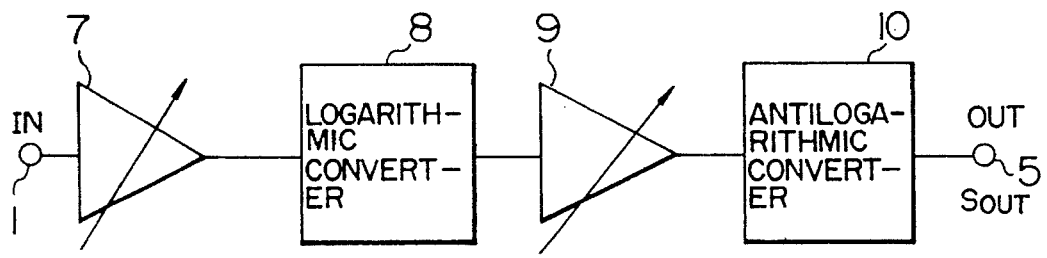
FIG. 22 is a block diagram showing a color corrector in a fourth embodiment according to the present invention.

Next, description will be given of an embodiment of the color corrector applicable to an arbitrary video apparatus having input and output characteristics to be approximated to two kinds of power characteristic. FIG. 22 shows in a block diagram a color corrector in a fourth embodiment according to the present invention. Shifting the dc level of an input signal to the color corrector having the characteristics of input and output signals in the differential format shown in FIG. 21, there can be selectively attained two different input/output characteristics to be approximated to two kinds of power characteristics such as a characteristic of S shape and a characteristic of inverse S shape for an arbitrary input signal. For example, in the circuit of FIG. 5, while supplying a signal from a terminal 44, a dc voltage for the dc shift can be inputted to a terminal 45. However, as can be clear from a fact that each of the curves of input/ output characteristics is symmetric with respect to the origin as shown in FIG. 21, namely, according to the sign of the signal value, only two kinds of symmetric power characteristics are realized by shifting the dc level of the input signal. Namely, two kinds of arbitrary power characteristics cannot be obtained. To overcome this difficulty, in the color corrector of the embodiment shown in FIG. 22, at least one of the circuit blocks including a signal amplitude adjuster 7, a logarithmic converter 8, a variable gain amplifier 9, and the antilogarithmic converter 10 has an asymmetric input/output characteristic in which the characteristic varies depending on the polarity of the signal. Providing each circuit block with directivity or orientation according to the signal polarity as above, there can be independently established two kinds of γ parameters and two kinds of input and output operational points fixed independently of the γ parameters. In consequence, using the embodiment, there can be provided a high-precision color corrector suitable for a circuit to drive a liquid crystal panel or the like in which an asymmetric inverse S characteristic is required as the input/output characteristic of the video signal system.

Figure 23:
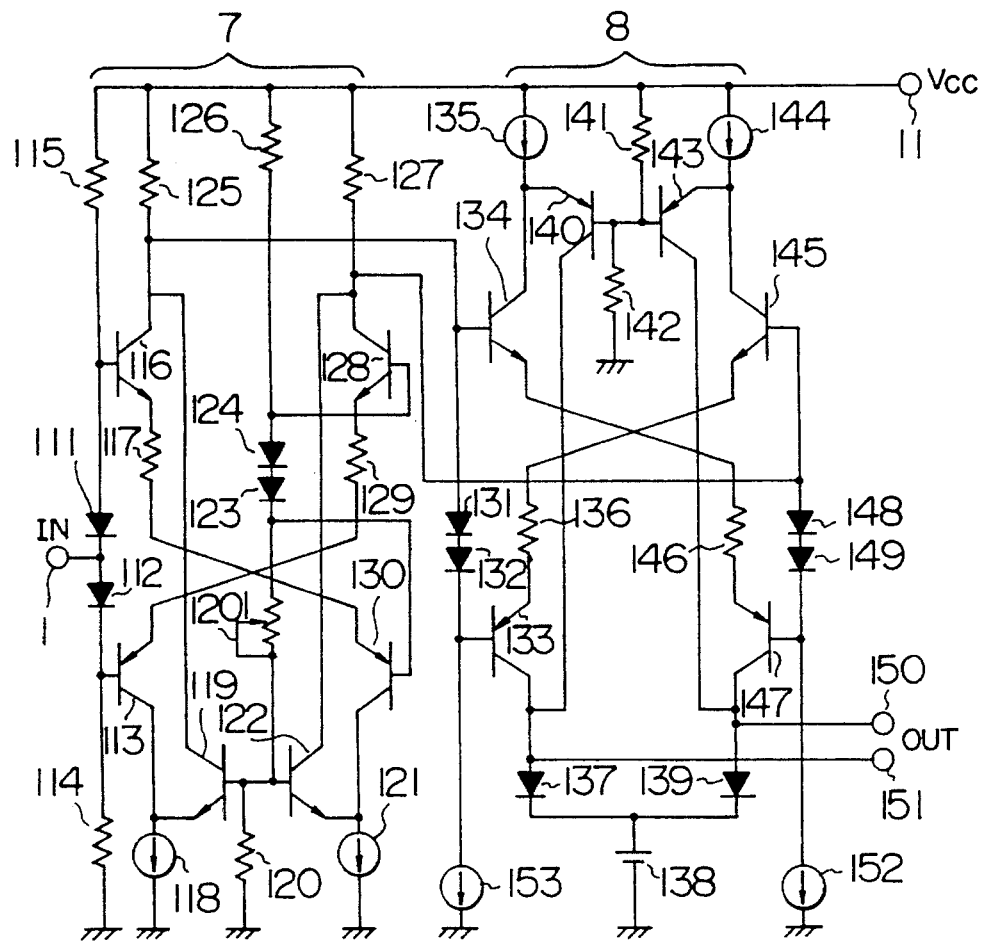
FIG. 23 is a circuit diagram showing a signal amplification adjuster 7 and a logarithmic converter 8 in a first specific example of the color corrector shown in FIG. 22.

FIG. 23 shows in a circuit diagram the signal amplitude adjuster 7 and the logarithmic converter 8 in the first specific example of the color corrector shown in FIG. 22. In this example, the adjuster 7 and the converter 8 are assigned with mutually different input/output characteristics according to the the signal polarity as above. In the color corrector of FIG. 23, a signal delivered to an input terminal 1 of the signal amplitude adjuster 7 is subjected to an amplitude variation according to a level of the signal to be fed to bases respectively of transistors 134 and 145 of the logarithmic converter 8 in the subsequent stage. Moreover, the signal is subjected to a logarithmic conversion according to the signal level to be outputted from terminals 150 and 151 so as to be inputted to the variable gain amplifier 9 in the next stage shown in FIG. 22. In this situation, when the input signal level of the adjuster 7 is higher than the voltage at a connecting point between diodes 123 and 124, transistors 116 and 130 turn on to a conductive state such that the voltage of the input signal is converted into a current via a resistor 117. Conversely, the input signal level is less than the voltage at a connecting point between diodes 123 and 124, transistors 113 and 128 turn on such that the voltage of the input signal is converted into a current via a resistor 129. The signal current is fed through transistors 122 and 119 and output resistors 125 and 127 to be restored to a voltage signal so as to be fed to the logarithmic converter 8 in the following stage. In this operation, changing the resistance value of a variable resistor 1201, the voltage developed at a connecting point between diodes 123 and 124 can be controlled. Moreover, setting the resistors 117 and 119 to appropriate resistance values, there can be realized a desired input/output characteristic. Each of the diodes 111, 112, 123, and 124 compensates for a temperature characteristic of the base-emitter voltage of a transistor connected to a base thereof. In addition, although current sources 118 and 121 function to guide signal currents to emitters respectively of the transistors 119 and 122, these sources 118 and 121 can be replaced with resistors. For the logarithmic converter 8 in the succeeding stage, a different input/output characteristic can be attained in a circuit configuration thereof similar to that of the signal amplitude adjuster 7. When the base voltage of the transistor 134 is higher than that of the transistor 145, the transistors 134 and 147 are set to be conductive. Conversely, when the base voltage of the transistor 134 is lower than that of the transistor 145, the transistors 145 and 133 become conductive. According to the cases above, the voltage of the signal is converted into a current respectively via a resistor 146 or 136 to be delivered from a diode 137 or 139 as a voltage signal undergone a logarithmic conversion. A voltage source 138 sets the dc level of the output signal. Grounded-base transistors 140 and 143 guide, like the transistors 119 and 122, the signal current to the output side. Diodes 131 and 132 as well as 148 and 149 compensate, like the diodes 134, for the temperature characteristic of transistors respectively connected thereto. Current sources 152 and 153 to bias the diodes connected thereto may possibly be replaced with resistors. It is to be understood that the above configuration having variable input/output characteristics is applicable also to the other circuit blocks.

Figure 24:
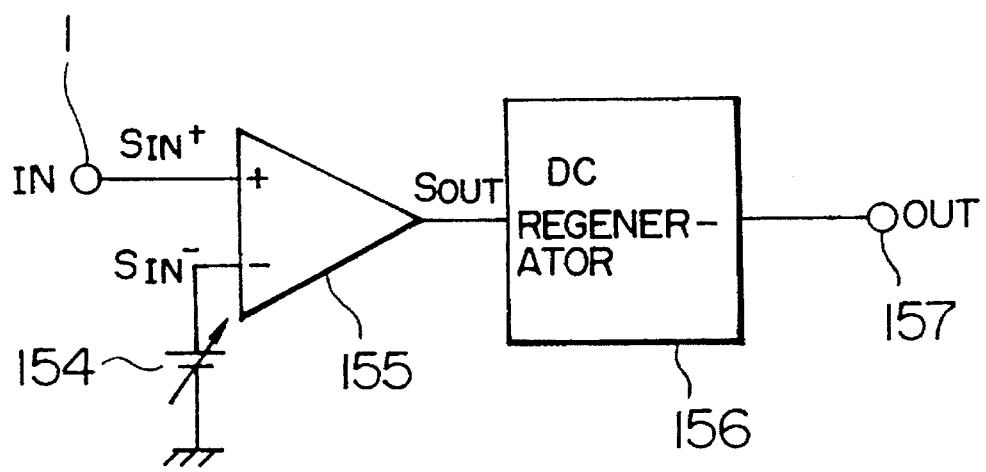
FIG. 24 is a block diagram showing a color corrector in a fifth embodiment according to the present invention.
Figure 25:
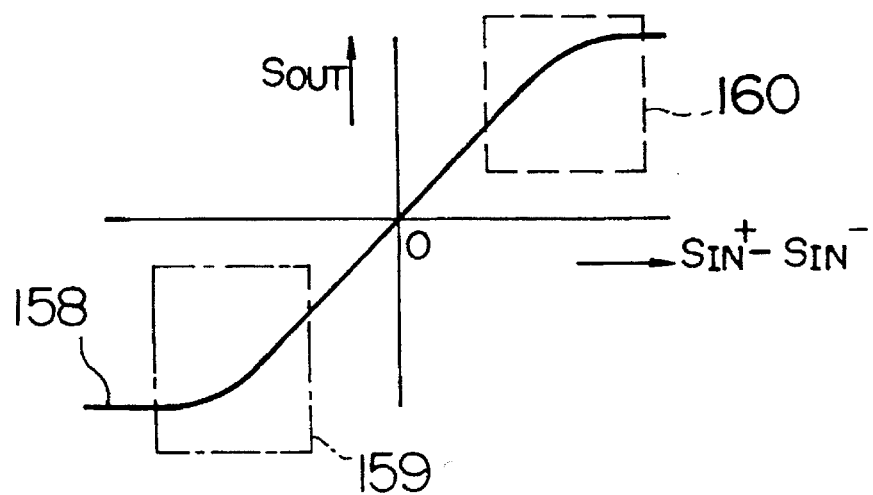
FIG. 25 is a characteristic graph showing an example of input/output characteristics of a differential amplifier.

Subsequently, description will be given of an embodiment capable of easily developing, by use of a nonlinear portion of the input/output characteristic of an amplifier, an input/output characteristic approximate to the characteristic of power. FIG. 24 shows in a block diagram a color corrector in a fifth embodiment according to the present invention. In FIG. 24, an input signal $S_{IN}(+)$ supplied to an input terminal 1 is subjected to a nonlinear amplification through a differential amplifier 155 to be an output $S'_{OUT}$. The signal is then fed to a dc regenerator 156 to be shifted to a desired dc level, thereby delivering an output signal from a terminal 157. To an inverse input terminal of the differential amplifier 155, there is connected a dc signal source 154 with a signal level $S_{IN}(-)$ to set a signal dynamic range. FIG. 25 shows an input/output characteristic of a general differential amplifier. In FIG. 25, the abscissa and the ordinate represent a differential input $S_{IN}(+)-S_{IN}(-)$ and the output $S'_{OUT}$, respectively. A characteristic curve 158 includes nonlinear sections enclosed with a broken line 160 and a dot-and-dash line 159, respectively. In consequence, changing a signal level of the dc signal source 154, a desired approximate power characteristic can be obtained according to an area of the nonlinear sections. To suppress the shift in the output operational point caused by the variation in the signal level of the dc signal source, the dc regenerator 156 is arranged in a stage following the differential amplifier 155. In addition, it is to be understood that the circuit system can be operated with the voltage and current signals and an inverse amplification can also be conducted in the signal amplification. Moreover, since ordinary amplifiers also have nonlinear regions in the end portions of the signal dynamic range thereof, the differential amplifier 155 can be substituted for an arbitrary amplifier. In such a case, an adder is disposed in a stage preceding the amplifier such that a signal produced from the dc signal source 154 is added by the adder to an input signal received from the input terminal 1 so as to deliver the resultant signal to the amplifier.

Figure 26:
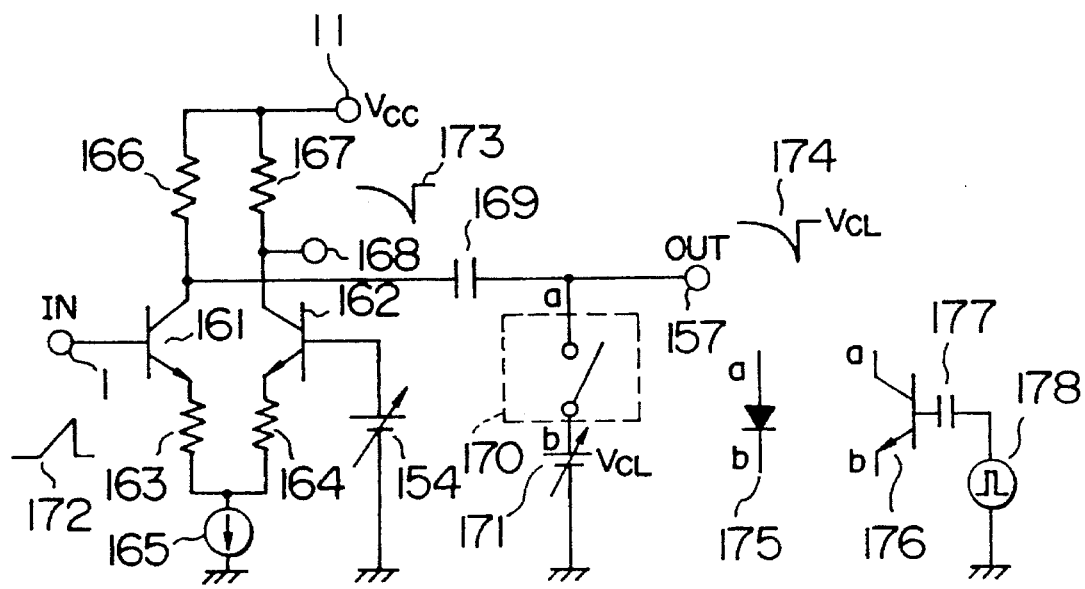
FIG. 26 is a circuit diagram showing a first specific example of the color corrector shown in FIG. 24.

FIG. 26 shows in a circuit diagram a first specific example of the color corrector shown in FIG. 24. In this example, a dc regenerator 156 includes a clamping circuit. In the color corrector of FIG. 26, an output signal from a differential amplifier 155 including transistors 161 and 162 is passed through a clamping circuit (namely, a dc regenerator) including a coupling capacitor 169, a clamping voltage source 171, and a switching circuit 170 to be fed to an output terminal 157. Operation of the color corrector will be described by reference to a signal waveform shown in FIG. 19. When a signal having a waveform 172 is supplied to an input terminal 1, a signal having a waveform 173 resultant from a nonlinear conversion appears from a collector of the transistor 161. For example, in a case where the switching circuit 170 is closed in synchronism with a peak voltage level of the signal waveform 173, there is attained from the output terminal 157, as indicated by a waveform 174, a signal of which the peak level is clamped to a voltage Vcc of the clamping voltage source 171. In this connection, the switching circuit 170 can be replaced with a diode 175 or a switching transistor 176 by using terminals a and b. When the diode 175 is employed, the peak level of the output signal is automatically clamped to the voltage Vcc of the clamping voltage source 171. When the switching transistor 176 is adopted, the clamping operation is carried out at a timing synchronized with a clamping pulse source 178. In a case where another output terminal 168 of the differential amplifier 155 is connected to the clamping circuit, the output signal waveform is naturally reversed.

Figure 27:
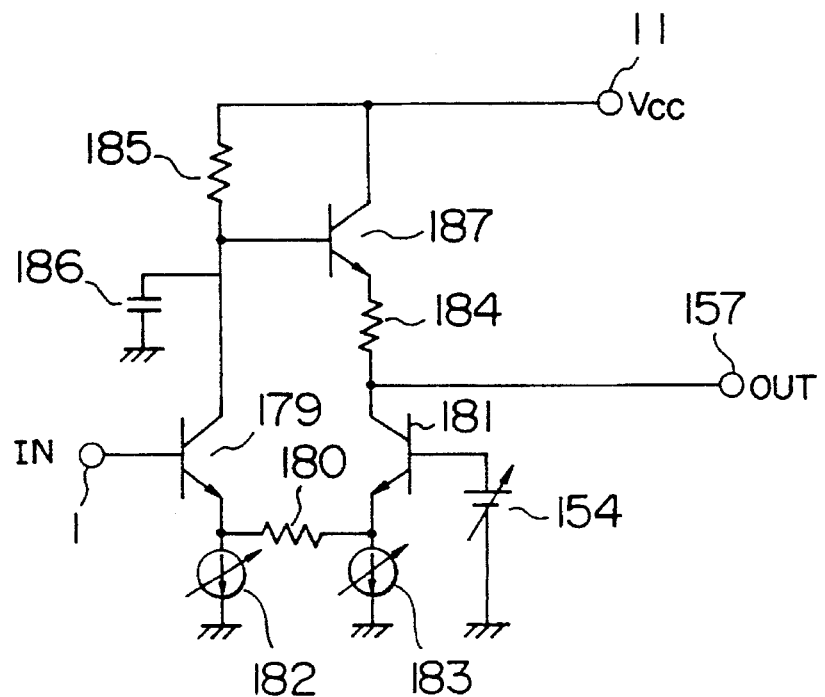
FIG. 27 is a circuit diagram showing a second specific example of the color corrector shown in FIG. 24.

FIG. 27 is a circuit diagram showing a second specific example of the color corrector shown in FIG. 24. In this example, the dc regeneration is accomplished according to a reverse output of the nonlinear output signal delivered from the differential amplifier circuit 155. In the color corrector of FIG. 27, a nonlinear signal is obtained from a non-reverse output terminal 157 of the differential amplifier 155 including transistors 179 and 181. Moreover, a dc regenerator 156 includes a resistor 185, a capacitor 186, a transistor 187, and a resistor 184 to attain a mean dc level of an inverse output signal from a low-pass filter including the resistor 185 and the capacitor 186. The mean dc level is applied via the transistor 187 and the resistor 184 to the output terminal 157, thereby achieving the dc regeneration. In this situation, the mean dc level of the inverse output signal attained from the low-pass filter including the resistor 185 and the capacitor 186 is changed in association with a variation in the signal level of the dc signal source 154 to set a signal dynamic range. However, since the voltage drop appearing across the resistor 184 having a resistance value equal to that of the resistor 185 is also varied to cancel out the variation in the mean dc level, the dc level of the output terminal 157 is fixed. In addition, changing the signal level of the dc signal 154, the nonlinear characteristic is also varied. However, the characteristic can be altered by changing the current values of bias current sources 182 and 183. For example, increasing the current value of at least one of the current sources 182 and 183, the value of the parameter γ approaches one.

Figure 28A:
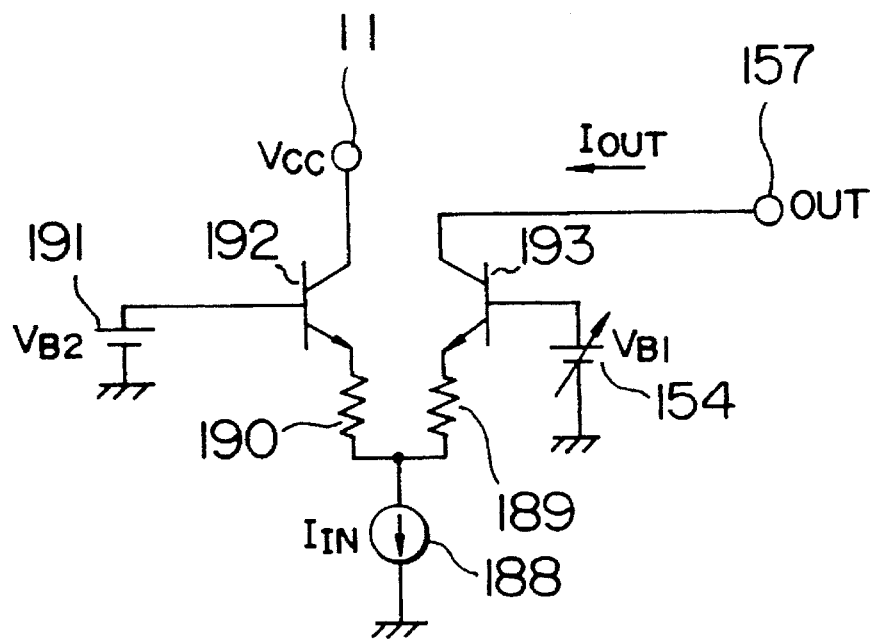
FIGS. 28A and 28B are explanatory diagram showing a color corrector as a sixth embodiment according to the present invention and input/output characteristics of the corrector.
Figure 28B:
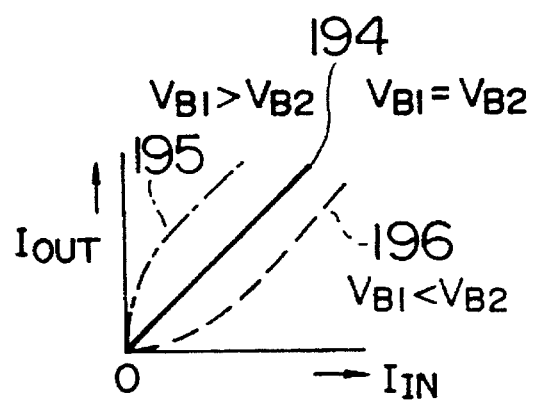

Subsequently, description will be given of an embodiment in which a current signal is transmitted in a differential circuit configuration as above to achieve a high-speed signal conversion of an approximated power characteristic. FIGS. 28A and 28B respectively show the circuit configuration of a color corrector in a sixth embodiment according to the present invention and a graph of the input/output characteristic of the color corrector. In the color corrector of FIG. 28A, the dc regenerator 156 is removed from the constitution of the embodiment shown in FIG. 17. In FIG. 28A, a signal current $I_{IN}$ is supplied via impedance elements 189 and 190 including resistors to a common emitter terminal of paired differential transistors 192 and 193 so as to obtain an output signal current $I_{OUT}$ via a collector of the transistor 193. In the operation, since the signal is transmitted in the form of a current, it is possible to neglect influence from the time constant of each circuit, thereby achieving a high-speed transmission. As the input/output characteristic of the color corrector of the embodiment, there is obtained, a nonlinear conversion characteristic representatively indicated by characteristic curves 194 to 196 according to magnitudes respectively of a control voltage $V_{32}$ and a bias voltage $V_{32}$ as shown in FIG. 28B.

Each color corrector described above is suitable for color correction in various video apparatuses having the nonlinear characteristic and/or systems including the apparatuses. For example, the color corrector is applicable to displays employing a Braun tube, a liquid crystal panel, a plasma display panel, an LED panel, or the like and video display apparatuses for a television receiver or the like. Moreover, the color corrector can be applied to video input devices such as a video camera and a scanner, video output devices including a printer, an electronic photograph, or the like, and/or a computer system, a broadcast and communication system, and the like using above devices.

Figure 29:
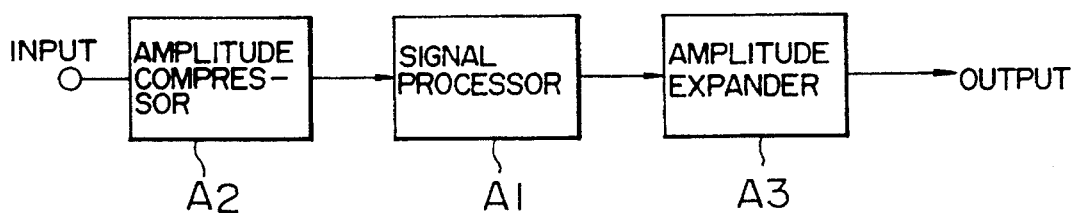
FIG. 29 is a block diagram showing an example of a signal processor adopting a signal converter according to the present invention.

In addition, the color corrector according to the present invention can be configured in the form of a small-sized analog circuit and hence can be fabricated as a module or an integrated circuit for a function block of a signal processor. For example, setting the parameter γ of the power characteristic to a value less than one, it is possible to compress the signal amplitude. When there is employed a combinational structure for compression and expansion of the signal amplitude as shown in FIG. 29, the signal dynamic range can be efficiently used in a signal processor A1 such as an amplifier and a high signal-to-noise ratio can be guaranteed. In FIG. 29, A2 indicates an amplifier compressor in which the parameter γ of the power characteristic according to the present invention is set to a value less than one and A3 stands for an amplitude expander in which the parameter γ is set to a value greater than one or to 1/γ.

Figure 30:
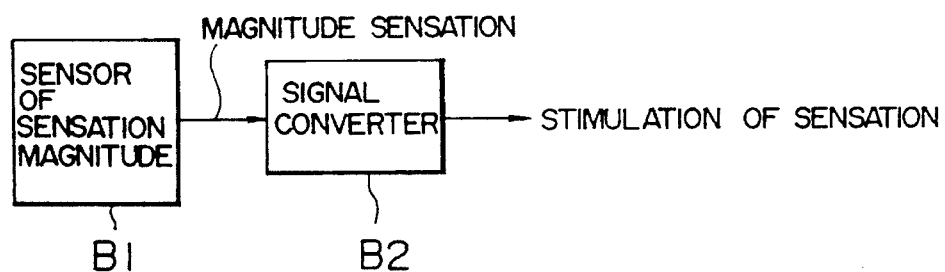
FIG. 30 is a block diagram showing an example of a feeling simulation system employing a signal converter according to the present invention.

Moreover, in this regard, senses of sight and hearing have a logarithmic characteristic. Using a signal converter in which the parameter γ of the power characteristic is set to a value less than one according to the present invention, there can be attained approximated signals associated with magnitudes of stimulation of these senses. FIG. 30 shows a sense simulation system having the configuration above. In FIG. 30, B1 denotes a sensor to obtain a magnitude of sense and B2 indicates a signal converter.

Figure 31:
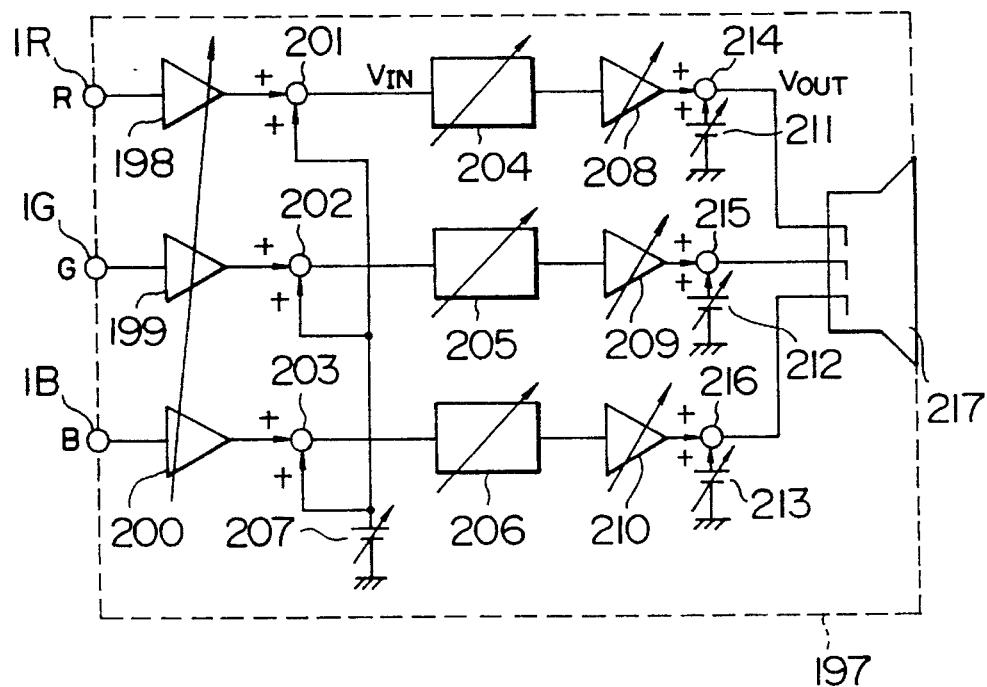
FIG. 31 is a circuit diagram showing a television receiver as a seventh embodiment according to the present invention.

Description will now be given of an embodiment in which the color corrector is applied to a television receiver adopting a color Braun tube which is a video display as one of the video apparatuses. FIG. 31 is a circuit diagram showing a television receiver in a seventh embodiment according to the present invention. In the television receiver 197 of FIG. 31, video signals of primary colors respectively corresponding to red, green, and blue are received from terminals 1R, 1G, and 1B and are then amplified to drive a color Braun tube 217. The video signals thus inputted are first subjected to such control operations common to the three primary colors as a contrast control and a brightness control. Namely, in variable gain amplifiers 198 to 200 each for conducting contrast adjustment, the video signals are amplified with an identical gain. Next, in adder circuits 201 to 203 each accomplishing brightness adjustment, a dc shift associated with a voltage of a voltage source 207 is applied to the video signals according to an identical level. Subsequently, each of the video signals is subjected to a gamma correction, a drive control, and a cutoff control, which are to be individually achieved for each color video signal. That is, in a gamma correction circuit 204, 205, or 206 associated with a color video signal supplied thereto, there is compensated for a nonlinearity between the video signal and a luminance of light emission of the Braun tube in response to the video signal, thereby accomplishing a fine adjustment of white balance. In variable gain amplifiers 208 to 210 for drive adjustment and adder circuits 214 to 216 for cutoff adjustment, deviations between the drive voltages of the Braun tune 21 respectively associated with three primary colors are coarsely compensated for through approximation to a linear characteristic so as to adjust the white balance. In this regard, although the gamma correction, the drive control, and the cutoff control may be executed in an arbitrary order, the gamma correction process is first conducted in the circuit configuration of FIG. 31.

Figure 32:
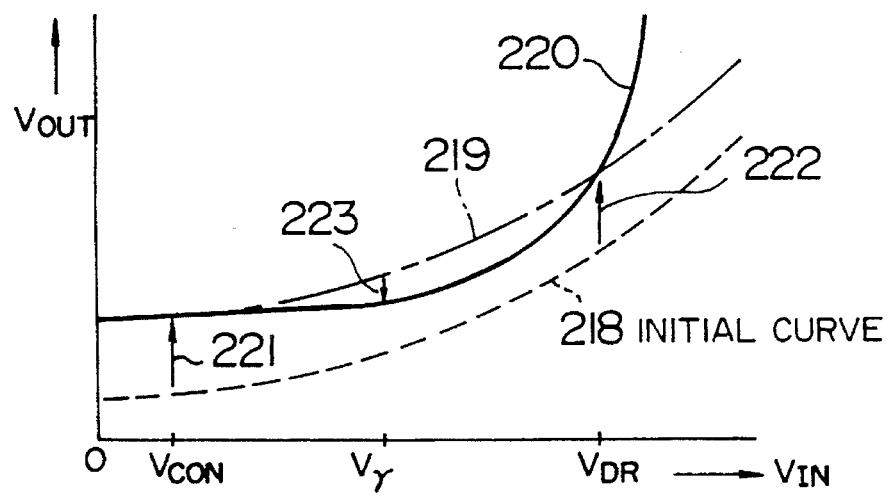
FIG. 32 is a characteristic graph showing relationships between a drive voltage level of a color Braun tube and an input signal level of a gamma correction circuit of FIG. 31.

Description will now be given in detail of the method of adjusting the white balance through the gamma correction, the drive control, and the cutoff control described above. FIG. 32 is a characteristic graph showing relationships (input/output characteristics) between the input signal level of the gamma correction circuit and the drive voltage level of the color Braun tube of FIG. 31. In FIG. 32, the abscissa stands for the input signal level $V_{IN}$ Of either one of the gamma correction circuits 204 to 206 and the ordinate represents the drive voltage level $V_{OUT}$ (the voltage is reversed if this is a cathode voltage) of the Braun tube 217. Assume that the input/output characteristic before the white balance adjustment including the gamma correction is represented by a curve 218 drawn with a broken line and the cutoff, gamma, and drive adjusting points associated with the input signal level $V_{IN}$ are denoted as $V_{CON}$, $V_T$, and $V_{DR}$, respectively. First, like in the conventional process of white balance adjustment, there are conducted a cutoff adjustment and a drive adjustment designated by arrows 221 and 222, respectively. Next, achieving a gamma correction designated by an arrow 223, an objective characteristic curve 220 is obtained. In the operation, setting a fixed operation point independent of the parameter γ to the drive adjusting point $V_{DR}$, it is guaranteed that the gamma and drive adjustments are carried out independently of each other. Moreover, at the cutoff adjustment point, influences from the parameter γ is inherently suppressed as shown in FIG. 23. However, to develop a higher precision for the white balance adjustment, the cutoff adjustment point $V_{CON}$ is set to a lower value and/or the adjustment is repeatedly effected.

Figure 33:
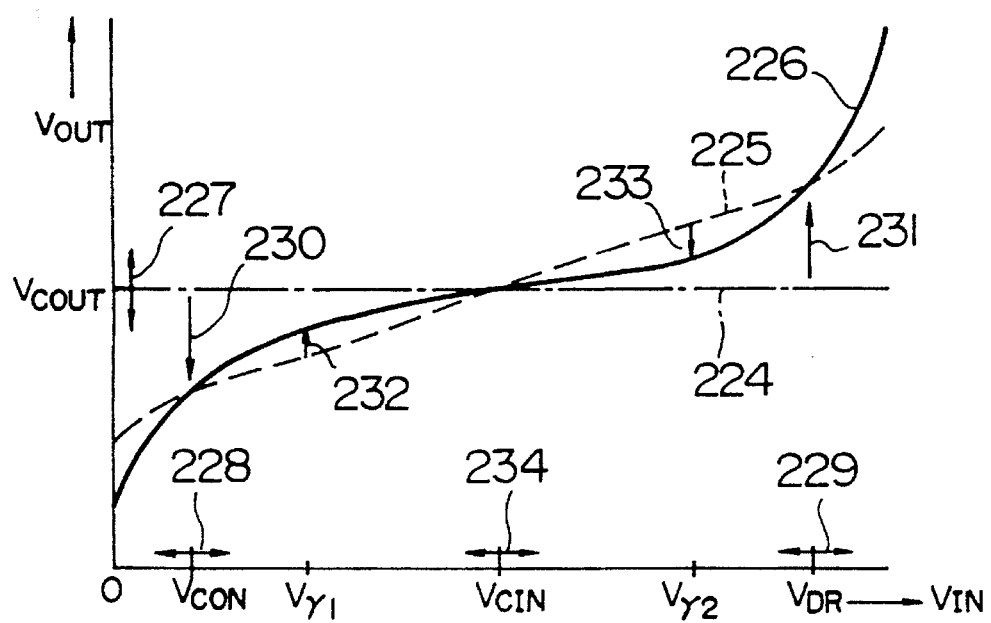
FIG. 33 is a characteristic graph showing relationships between a drive voltage level of a liquid-crystal display panel and an input signal level of a gamma correction circuit of FIG. 31 using the liquid-crystal display panel as the display element.

The construction of FIG. 31 is also applicable to other video display apparatuses including, for example, a display and a television receiver utilizing as a display element thereof a liquid crystal panel, plasma display panel, and/or an LED panel. For example, when a liquid crystal panel is adopted as the display element, the color Braun tube 217 of FIG. 31 is substituted for a liquid crystal panel. Moreover, as the gamma correction circuits 204 to 206, there are disposed color correctors developing an input/output characteristic to be approximated to two kinds of power characteristics as shown in FIG. 22. Description will be now given of a method of adjusting the white balance through the gamma correction, the drive control, and the cutoff control when a liquid crystal panel is employed as the display device. FIG. 33 is a characteristic graph showing relationships (input/output characteristics) between the input signal level of the gamma correction circuit and the drive voltage level of the liquid crystal panel in a case where the liquid crystal panel is used as the display element. First, in a stage in which the amplification gain is set to a minimum value through the drive control, a cutoff control is accomplished to set the drive voltage level $V_{OUT}$ to a standard level $V_{COUT}$ to set an inflection point of a target characteristic curve 226 (arrow 227). Subsequently, the input reference level $V_{CIN}$ is set to the standard inflection point to thereby attain a characteristic 224 draw with a dot-and-dash line (arrow 234). In this connection, for example, when the specific example of FIG. 23 is used as the color corrector of FIG. 22, the input reference level $V_{CIN}$ can be established as described above by adjusting the variable resistor 1201 and the like of FIG. 23. Next, to guarantee independence of the gamma correction at the cutoff adjusting point, there is adjusted the gain $K_1$ on the negative polarity side of the signal amplitude adjuster 7 having directivity according to the signal polarity as shown in FIG. 23 (arrow 228). Similarly, to retain independence of the gamma correction at the drive adjusting point, there is adjusted the gain $K_2$ on the positive polarity side of the signal amplitude adjuster 7 having directivity according to the signal polarity as shown in FIG. 23 (arrow 229). However, in the designing process, it may also be possible to determine, in association with the signal dynamic range of the circuit, the setting of the input reference level $V_{CIN}$ and the adjusting process to reserve independence of the gamma correction at the cutoff and drive adjusting points, thereby unnecessitating the setting and the adjusting process. Subsequently, the cutoff and drive adjusting steps are effected as indicated by arrows 230 and 231 to realize a characteristic curve 255 drawn with a broken line. Finally, gamma corrections are achieved as indicated by arrows 232 and 233 to obtain a target characteristic 226, thereby completing the white balance adjustment.

Figure 34:
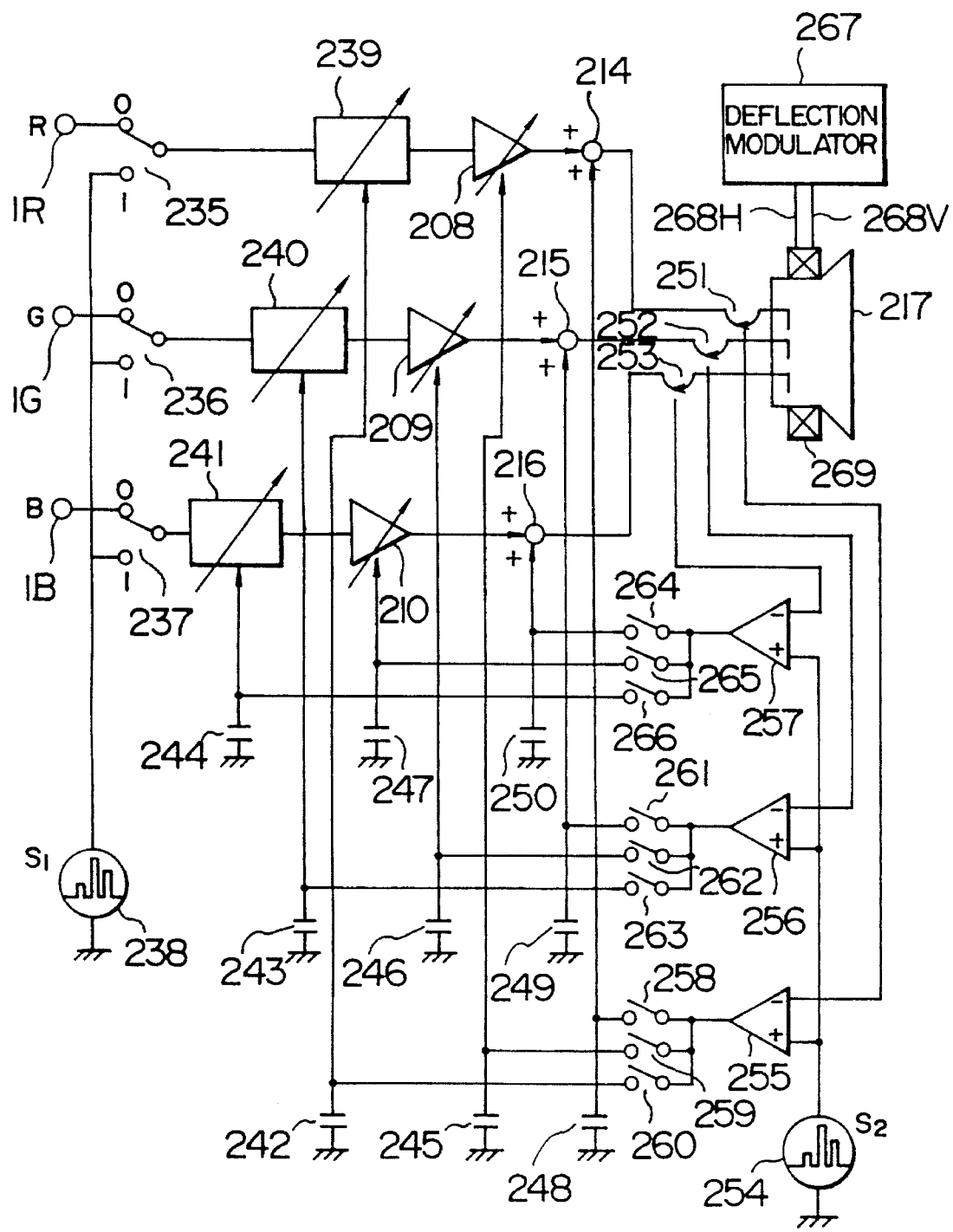
FIG. 34 is a circuit diagram showing a television receiver as an eighth embodiment according to the present invention.
Figure 35:
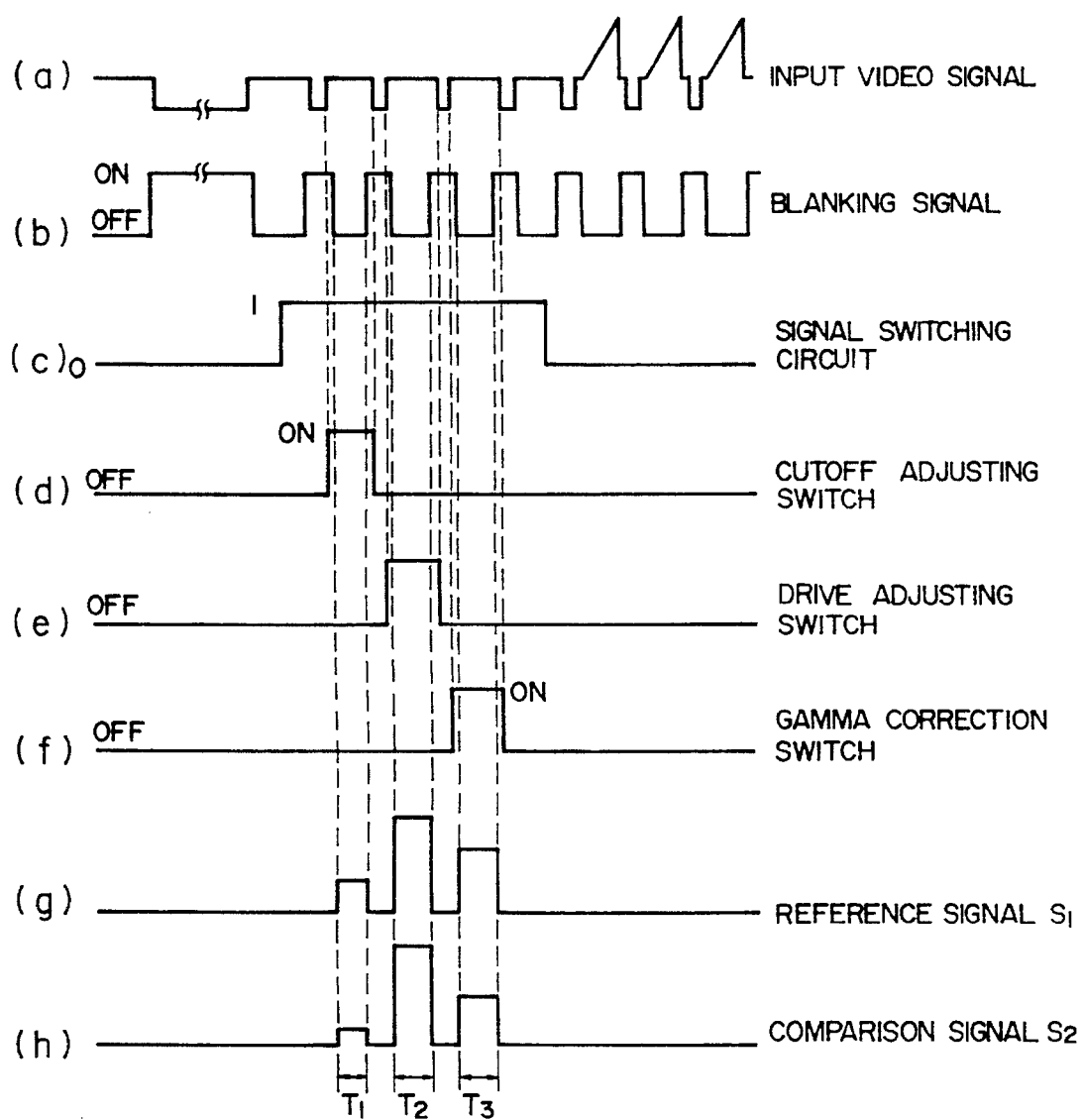
FIG. 35 is a signal timing chart showing timings of primary signals and principle operations of FIG. 34.

Next, description will be given of an embodiment capable of achieving automatic adjustment of the gamma correction, drive adjustment, and cutoff adjustment. According to the embodiment, in a television receiver employing a color Braun tube, the gamma correction, the drive control, and the cutoff control are automatically accomplished. FIG. 34 shows a circuit diagram of a television receiver in a eighth embodiment according to the present invention. In FIG. 4, there are missing the common circuit sections related to the contrast and brightness control operations. In the television receiver of FIG. 34, video signals of three primary colors inputted thereto are respectively fed through signal switching circuits 235 to 237 respectively to gamma correction circuits 239 to 241 each including the color corrector above. Thereafter, the video signals are respectively passed through variable gain amplifiers 208 to 210 for drive adjustment, adder circuits 214 to 216 for cutoff adjustment, and beam current sensor 251 to 253 to a cathode of a color Braun tube 217. Incidentally, the deflection modulator 267 is not necessarily required to be disposed in a television receiver of an ordinary over-scan scheme, which will be described later. Next, description will be given of operation of the automatic adjustment by reference to FIG. 35. FIG. 35 is a signal timing chart showing timings of primary signals and operations of FIG. 34. In FIG. 35, a waveform (a) represents an input video signal of a primary color, whereas a pulse waveform (b) stands for a blanking signal. First, when signal switching circuits 235 to 237 are respectively set to connecting points 1 as can be seen from a waveform (c) in a range of time from immediately after a vertical blanking period to immediately before a display period. As a result, a reference signal S1 outputted from a reference signal source 238 as indicated by a waveform (g) is delivered via the signal switching circuits 235 to 237 to the gamma correction circuits 239 to 241. The sensor circuits 251 to 253 then sense resultant beam currents and supply sensed values to comparators 255 to 257, respectively. On the other hand, a comparison signal source 354 creates a comparison signal $2 as denoted by a waveform (h) at a timing synchronized with the reference signal S1 to feed the signal $2 to the comparators 255 to 257. In the comparators 255 to 257, the inputted sense signals are respectively compared with the signal $2 such that control signals representing the respective comparison results are delivered to switching circuits 258 to 260, 261 to 263, and 264 to 266, respectively. In synchronism with the reference signal S1, the cutoff adjusting switches 258, 261, and 264 are turned on at a timing indicated by a waveform (d), the drive adjusting switches 259, 262, and 265 are turned on at a timing indicated by a waveform (e), and the gamma correction switches 260, 263, and 266 are turned on at a timing indicated by a waveform (f). In consequence, according to the timings above, the respective control signals are sequentially supplied from the gamma correction circuits 239 to 241, the drive adjusting amplifiers 208 to 210, and the cutoff adjusting adders 214 to 216 such that for the respective control operations, the cutoff adjustment, the drive adjustment, and the gamma correction are repeatedly achieved in this order. Furthermore, the control signals obtained in the cutoff adjustment, those attained in the drive adjustment, and those developed in the gamma correction are kept in the capacitors 248 to 250, 245 to 247, and 242 to 244, respectively for one vertical synchronization period. During the automatic adjusting operation above, the respective adjustments are repeatedly effected. Consequently, only when the circuit system is configured in conformity with a convergence condition, it is not necessary to guarantee the independence of the gamma correction of the cutoff and drive adjustments.

Figure 36:
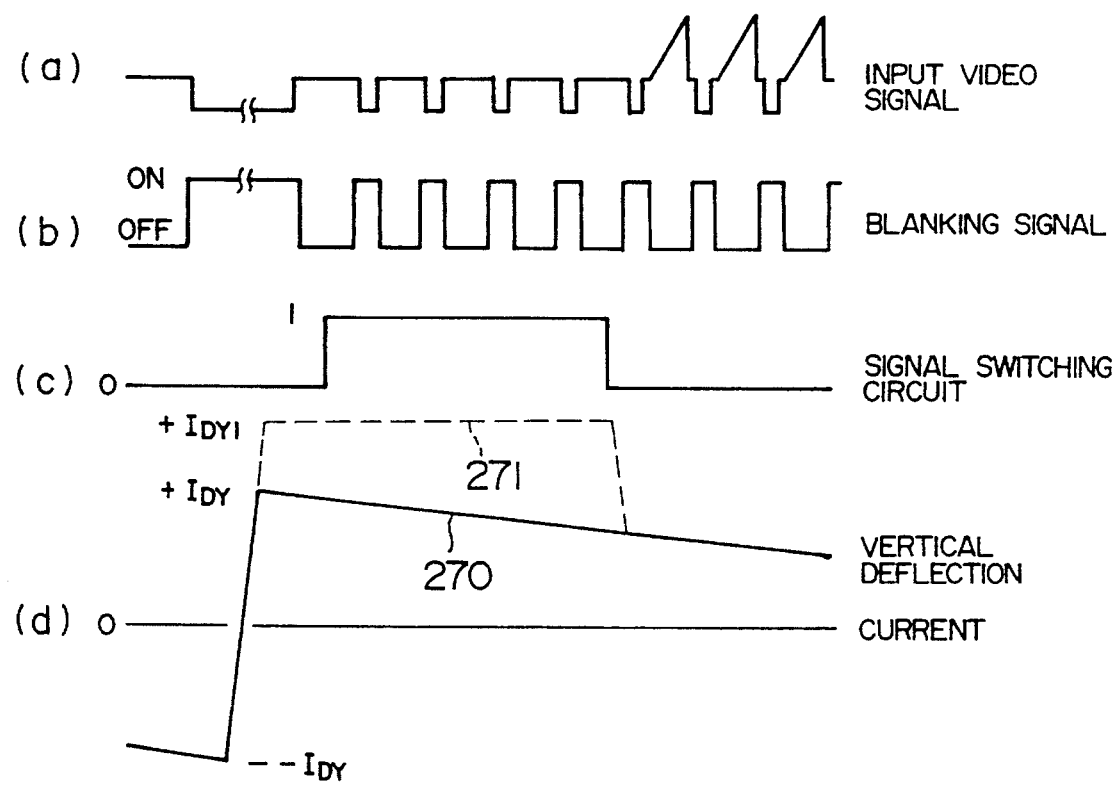
FIG. 36 is a signal timing chart showing timings of primary signals and principle operations of FIG. 34 using a deflection modulator 267.

In the operation, as shown in the waveform (c) of FIG. 35, the beam current is to be supplied according to the reference signal S1 during a non-display period. Consequently, this operation cannot be directly applied to video display apparatuses such as a computer display and a monitor system of a broadcast station using an under-scan scheme in which the overall scanning screen is displayed in the effective display area of the Braun tube for the following reasons. When the beam current flows in response to the reference signal S1, there occurs light emission in the effective display screen to resultantly gives an uncomfortable feeling to the user; moreover, there may possibly take place deterioration of fluorescent materials of the Braun tube. Description will now be given of the configuration also applicable to the video display apparatus of the under-scan scheme. Namely, in the configuration of FIG. 32, there is additionally disposed a deflection modulator 267 to be connected via control signal lines 268H and 268V to a deflection yoke 269 of the color Braun tube. The deflection modulator 267 modulates a deflection current supplied to a vertical or horizontal deflection coil of the deflection yoke 269 to remove the electron beam caused by the reference signal S1 from the effective display screen, thereby preventing the light emission. This operation will now be described by reference to FIG. 36. FIG. 36 is a signal timing chart showing timings of the primary signals and sections of FIG. 34 including the deflection modulator 267. Waveforms (a) to (c) of FIG. 36 are equal to waveforms (a) to (c) of FIG. 33, whereas a waveform (d) of FIG. 36 represents a signal timing of the vertical deflection current. That is, modulating the vertical deflection current by the modulator 267, the vertical deflection current is temporarily increased as denoted by a broken like 271 relative to the state indicated by a solid line 270. Resultantly, like in the video display apparatus of an over-scan scheme employed in an ordinary television receiver or the like, it is possible to delete the electron beam produced in response to the reference signal S1 from the effective display screen of the Braun tube. Moreover, it is to be appreciated that the embodiment coping with the under-scan scheme is applicable to a video receiver of the over-scan scheme.

Figure 37:
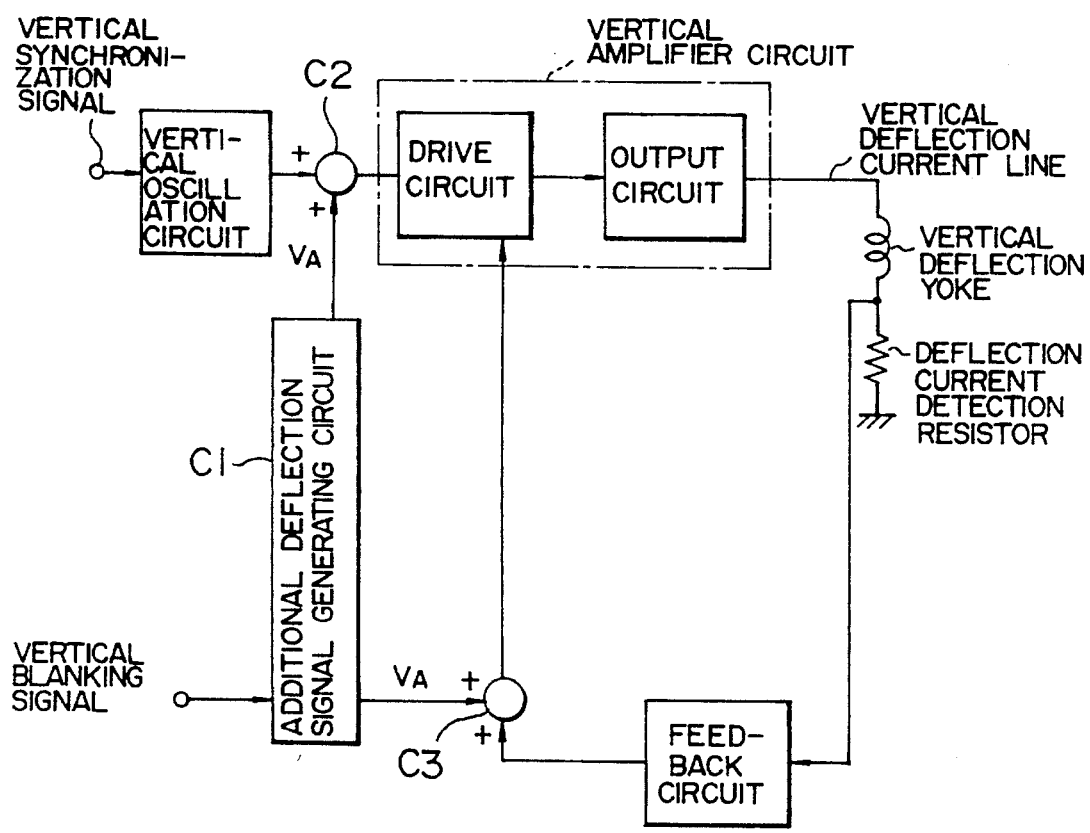
FIG. 37 is a block diagram showing a specific circuit configuration of the deflection modulator of FIG. 34.

FIG. 37 shows in a circuit diagram an example of the configuration of the deflection modulator 267. In FIG. 37, on receiving a vertical retrace signal, an additional deflection signal generator C1 produces a signal $V_A$. The additional deflection signal $V_A$ is added by an adder C2 or C3 to the deflection signal to resultantly obtain a vertical deflection current indicated by the waveform (d) of FIG. 36.

Figure 38:
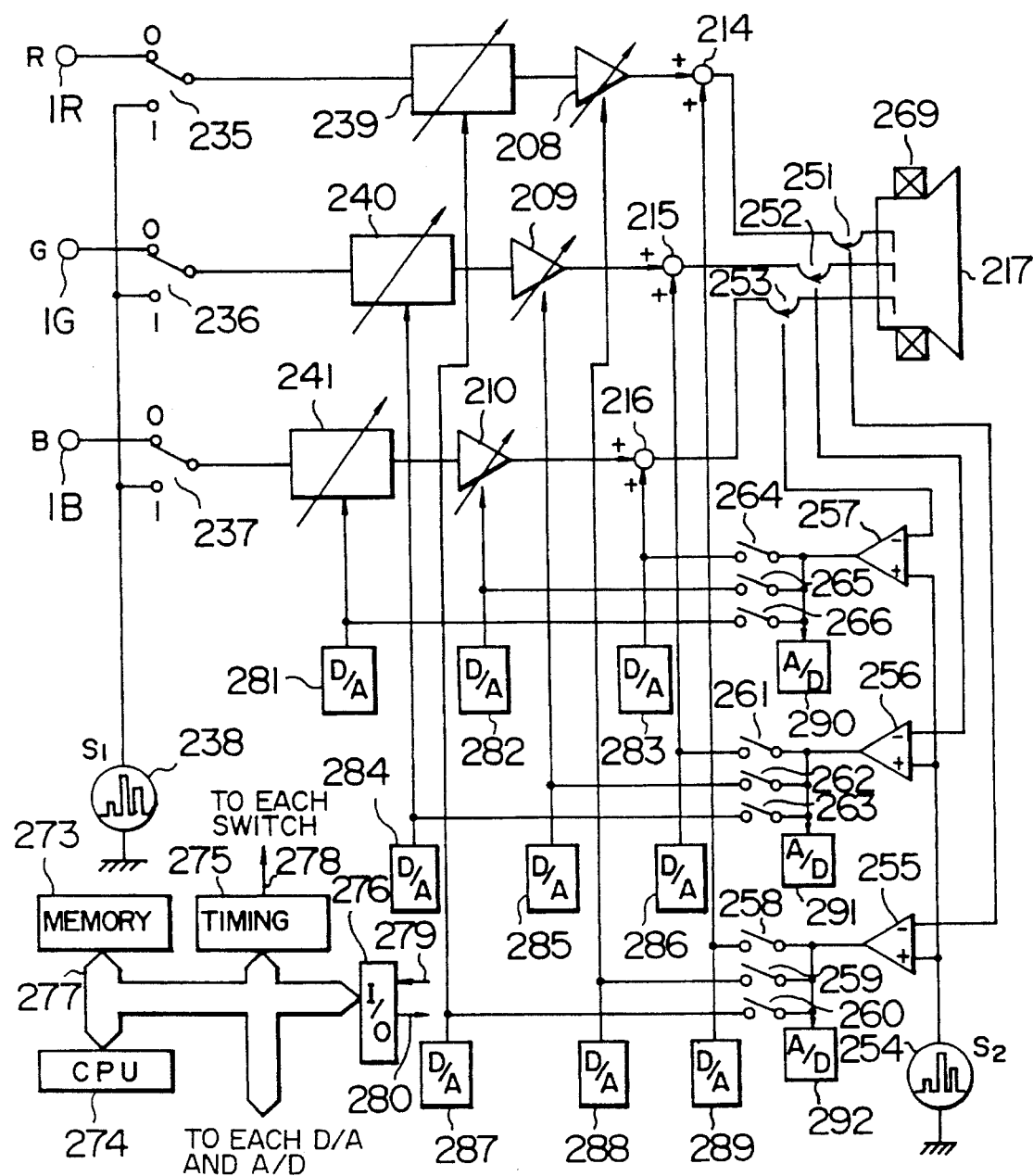
FIG. 38 is a circuit diagram showing a video receiver of an under-scan system such as a computer display as a ninth embodiment according to the present invention.

Next, description will be given of an embodiment capable of preventing the light emission occurring in response to the reference signal S1 like in the case above without using the deflection modulator 267 of FIG. 34. FIG. 38 shows in a circuit diagram of a video receiver such as a computer display in a ninth embodiment according to the present invention. Also in FIG. 38, the common control circuits including the contrast and brightness control sections are missing. The video receiver of FIG. 38 includes a digital control section including a bus line 277 and a central processing unit (CPU) 274, an input/output (I/O) interface 276, a memory 273, and a timing pulse generator 275 which are connected to each other via the bus line 277. In addition, to connecting pints of the capacitors 242 to 250 keeping the control signals attained in the respective adjustments in FIG. 34, there are respectively connected digital-to-analog (D/A) converters 281 to 289. Furthermore, outputs from the comparators 255 to 257 are connected to A/D converters 280 to 292, respectively. Description will now be given of operation of the video receiver of FIG. 38. First, in a pre-adjusting stage prior to an ordinary operation of the video receiver, like in the video receiver of FIG. 34, switching circuits 235 to 237 are respectively set to connection points 1 to supply the reference signal S1 from a reference signal source 238 to gamma correction circuits 239 to 241, thereby accomplishing the cutoff adjustment, the drive adjustment, and the gamma correction. In this operation, control signals produced from the comparators 255 to 257 are fed via the A/D converters 290 to 292, the signal line 279, and the I/O interface 276 to the digital control section so as to write the signals in a memory 273 of the digital controller in synchronism with the scanning period. In this regard, the signal switching circuits 235 to 237 and switches 258 to 266 are controlled according to timing pulses from the timing pulse generator 275. Thereafter, in the ordinary operation of the video receiver, the switching circuits 235 to 237 are respectively set to connection points 0 to prevent the reference signal S1 from being delivered from the reference signal source 238 to the gamma correction circuits 239 to 241. At a timing synchronized with the scanning period, the control signals beforehand obtained in the pre-adjustment are read from the memory 273 to be supplied via the I/O interface 276, a signal line 280, the D/A converters 281 to 289 sequentially to the gamma correction circuits 29 to 241, the drive adjusting amplifiers 208 to 210, and the cutoff adjusting adders 214 to 216, thereby achieving the respective adjustments. Consequently, in an ordinary use of the video receiver, it is only necessary to read the control signals beforehand obtained in the pre-adjustment from the memory 273. Namely, since the operation to supply the beam current in response to the reference signal S1 during the non-display period is unnecessitated, there does not occur the light emission due to the reference signal S1 in the effective display screen. In addition, using the control signals of the respective adjustments stored in the memory 273, it is possible to compensate for unevenness in the brightness as well as colors (color shading). Moreover, setting in advance data of historical or secular changes in the form of coefficients, the control signals of the respective adjustments can be altered according to the accumulated utilization period of the video receiver, thereby compensating for the secular variation in characteristics of the video receiver.

Figure 39:
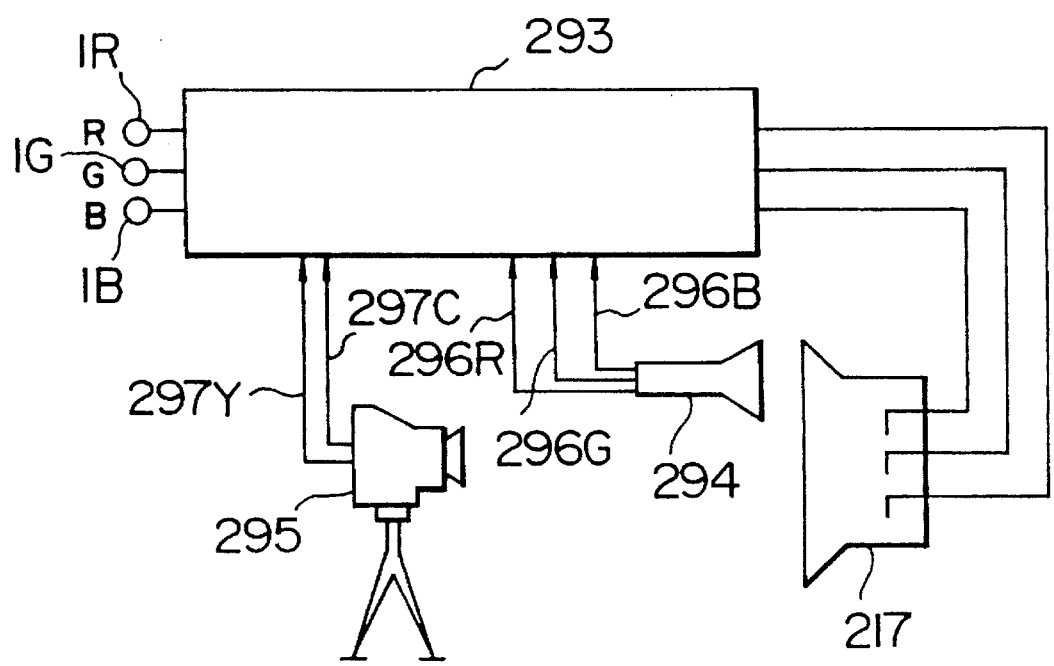
FIG. 39 is a diagram showing the configuration of a video receiver as a tenth embodiment according to the present invention.

In this connection, for the compensation and adjustment of the nonuniform brightness and colors, the correction is required to be achieved in association with a display position of each pixel on the display screen. Description will now be given of an embodiment capable of achieving the correction in association with a display position of each pixel on the display screen. FIG. 39 is a configuration diagram showing a video receiver in a tenth embodiment according to the present invention. In FIG. 39, a circuit block 293 is connected between terminals 1R, 1G, and 1B and the color Braun tube of FIG. 38. In the video receiver of FIG. 38, when conducting the pre-adjustment before an ordinary operation thereof, the beam current is sensed by the sensor circuits 251 to 253 to thereby sense colors on the display screen. In contrast thereto, according to the video receiver of FIG. 39, the correction is effected in association with the display position of each pixel. Consequently, in the pre-adjustment, a video camera 295 or a photodetector 294 is adopted in place of the beam current sensors 251 to sense colors, namely, luminance of the light emission on the display screen. That is, when using the video camera 295 including an imaging tube or a charge-coupled device (CCD) sensor, the sense output is supplied to the comparators 255 to 257 of FIG. 38 in synchronism with the image scanning operation of the video camera 295. Control signals obtained as a result of the above operation are delivered to the digital control section to enhance an automatic high-speed compensation of the nonuniform luminance and the color shading. Moreover, when using the photodetector 294 representatively a tintometer or a photometer such as a spectrophotometer, the sense output signal is inputted to the comparators 255 to 257 correspondingly to the sense region. Resultant control signals are sent to the digital control section to achieve a high-precision compensation of the nonuniform luminance and colors. As the sense outputs from the video camera 295 and the photodetector 294, in addition to the primary color signals obtained from signal lines 296R, 296G, and 296B, there can be considered luminance signals, color signals, and signals corresponding to color stimulation values X, Y, and Z attained from signal lines 297Y and 297C. It is to be appreciated that the circuit block 293 includes an interface section for the sense output signals. Moreover, using the video camera 295 and photodetector 294, it is also possible to conduct a purity compensation in association with influences from the convergence and terrestrial magnetism. In addition, imaging an object printed on a printing form by a printer by the video camera, a scanner, or the like in place of display pixels of the Braun tube or the like, it is possible to conduct a color compensation for other imaging device. Alternatively, using a reference video camera 295, imaging results of a plurality of video cameras can be compared with each other for correction, thereby conducting the color compensation for other imaging device.

Figure 40A:
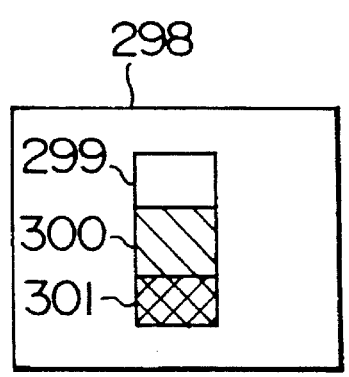
FIGS. 40A and 40B are diagrams for explaining examples of the adjusting display pattern to be displayed on a color Braun tube 217 in a pre-adjustment of the video receiver of FIG. 39.
Figure 40B:
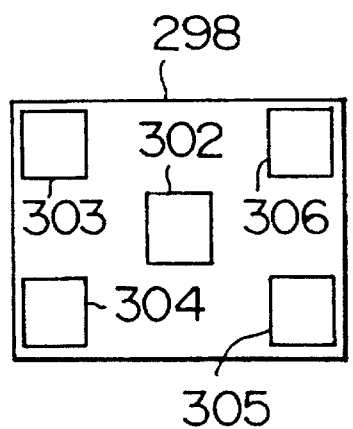

FIGS. 40A and 40B show examples of adjusting display patterns to be presented on the color Braun tube in the pre-adjustment of the video receiver of FIG. 39. In the adjusting pattern of FIG. 40A, there is displayed in an effective display area 298 a drive adjusting high-luminance window 299, a gamma adjusting middle-luminance window 300, and a cutoff adjusting low-luminance window 301. The window patterns can be displayed, in addition to the vertical arrangement as shown in FIG. 40A, in an arrangement that the patterns are sequentially displayed in the same location, thereby suppressing influences from the nonuniform luminance and colors. The patterns can be displayed in an arbitrary color such as white, a primary color, or the like; moreover, these colors can be sequentially displayed. Measuring the window patterns by a photodetector or the like, it is possible to conduct the color correction such as the white balance adjustment including the gamma correction. Moreover, in the adjusting pattern of FIG. 40B, window patterns 302 are displayed in a central location and in four corners of the effective display area 298. These window patterns may be displayed in an arbitrary color such as white or a primary color and is suitable for detection of the nonuniform luminance and colors. Furthermore, sequentially displaying the window patterns, the nonuniform luminance and colors can be compensated for by a single photodetector or the like.

Figure 41:
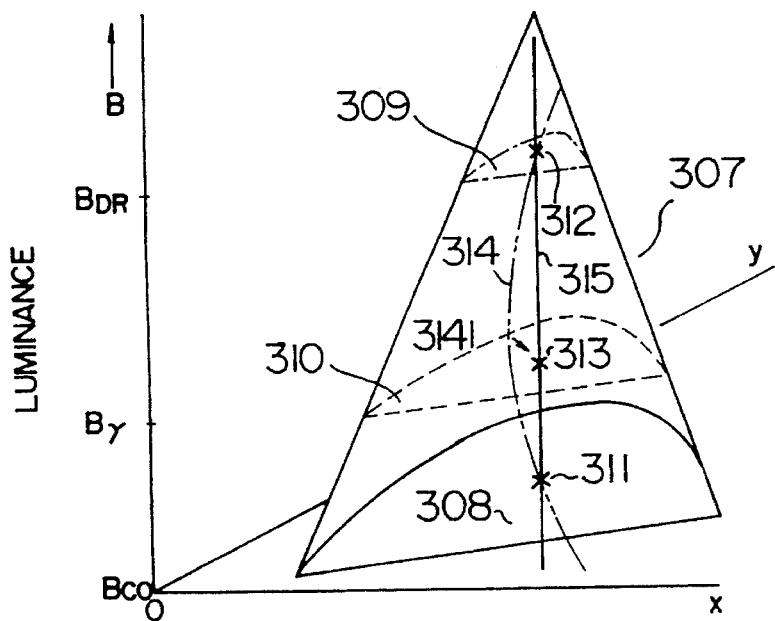
FIG. 41 is an explanatory diagram of a color reproduction space useful to explain a process of color correction when the color corrector is applied to a video apparatus.

Referring now the color reproduction space shown in FIG. 41, description will be given of an application in which the color corrector is employed in a video display apparatus, a video input device, and/or a video output device. In FIG. 41, the plane defined by the x and γ axes represents a chromaticity plane, whereas the ordinate stands for a display brightness at a display position for the video display apparatus, brightness of an obtained image for a video input device such as a scanner or an imaging device, and a printing lightness for a video output device such as a printer. In general, the color reproduction space of a video apparatus, the range of chromaticity is narrowed according to increase in brightness or the like as representatively indicated by a solid line 307. When conducting a color adjustment in a video apparatus according to a conventional technology, there are employed as two adjusting target points chromaticity points 311 and 312 in chromaticity regions 308 and 309 related to a low luminance BCO and a high luminance BDR. Consequently, the color reproduction characteristic after the color adjustment becomes disadvantageously apart from an appropriate chromaticity point 313 in a middle luminance By as indicated by a curve 314 drawn by a two-dots-and-dash line. In accordance with the present invention, also in the chromaticity region 310 of the middle luminance Bγ, the color adjustment can be achieved as indicated by an arrow 3141 with the chromaticity point 313 set as a third target adjusting point. As a result, through the color adjustment, there can be obtain a high-precision characteristic of color reproduction as indicated by a solid line 315.

Figure 42:
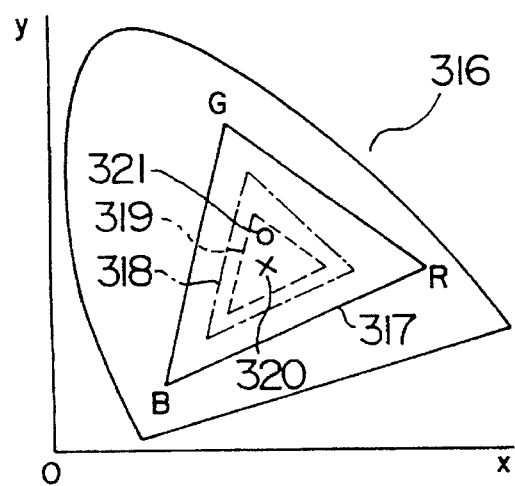
FIG. 42 is a chromaticity diagram for explaining influences of colors of external lights onto the video apparatus.

Subsequently, influences of external lights upon the video apparatus will be described by reference to a chromaticity diagram in an x-y plane of FIG. 42. In the diagram of FIG. 42, a triangular region 317 in an actual color area 316 represents a color reproduction range in a state free of external lights. A reference white chromaticity point 320 of the video apparatus in the absence of external lights can be substantially retained even when there exists a strong external light only if the external light has a color which can be approximated to a reference white color. However, due to influences from the external light, the color reproduction range is minimized to a region enclosed by a broken line 319. In a case of an external light primarily including components of green, although the color reproduction range is slightly reduced to an area enclosed by a dot-and-dash line 318, a chromaticity point 321 of the white display is considerably moved toward green. In a conventional video display, typically, a television receiver or a computer display, to overcome this difficulty, there are employed countermeasures, for example, to increase the brightness control value and the contrast control value against influences from illumination of external lights. However, influences from chromaticity of external lights cannot be compensated for.

Figure 43:
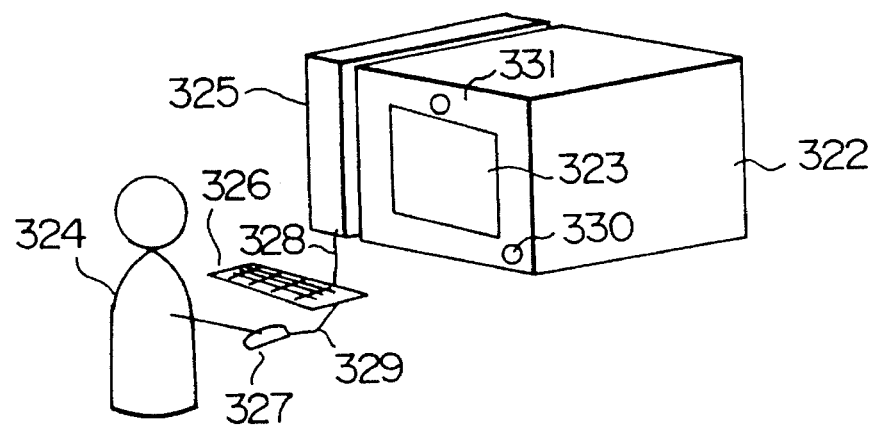
FIG. 43 is a perspective view showing a video display device as an 11th embodiment according to the present invention.

Next, description will be given of an embodiment capable of compensating for also influences from chromaticity of external lights. FIG. 43 shows in a perspective view a video display as a 11th embodiment - according to the present invention. As can be seen from FIG. 43, the video display 322 using the color corrector above includes a display screen 322, external light sensors 330 and 331 for measuring chromaticity and brightness of external lights, a mouse 327, a keyboard 326, a computer 325, and a user 324 operating the computer 325 via the mouse 327 and the keyboard 326. In addition, as shown in FIG. 43, the sensors 330 and 331 are arranged at positions respectively over and below the display screen. Thanks to the horizontally shifted arrangement of the sensors 330 and 331, it is also possible to estimate distribution of external lights on the display screen 323. In other words, the color correction can also be achieved on assumption that differences between measurement results from a plurality of external light sensors are uniformly distributed between the measurement points. In such a case, like in the compensation for the nonuniform brightness and color unevenness or shading, it is possible to conduct the correction in association with the display position.

Figure 44:
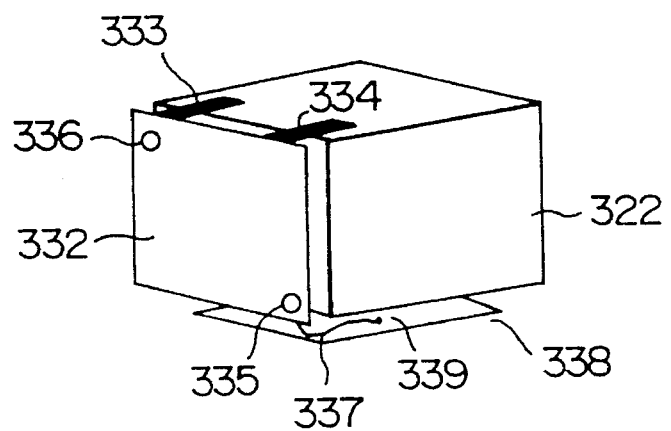
FIG. 44 is a perspective view showing a video display device as an 12th embodiment according to the present invention.

Furthermore, description will be given of another embodiment capable of compensating for influences from external lights. FIG. 44 is a perspective view showing a video display as an 12th embodiment according to the present invention. As shown in FIG. 44, the video display 322 to which the color corrector is applied includes external light sensors 335 and 336 on a filter 332 to prevent external light from reflecting on the display screen and for prevention of possible injuries to health of the user due to static electricity from the display screen. Signals from the sensors 335 and 336 are delivered via a signal line to a connector 339 on a tilt display-stand 338 so as to be sensed by an appropriate sensor. Recently, a filter (332) of this type is mounted on the video display 322 by retainers 333 and 334 in many cases. Consequently, disposing on the filter 332 a plurality of external light sensors in the positional relationships like those of the sensors 335 and 356, the correction can be conducted for each display position like in the the embodiment of FIG. 43. In this connection, the sensors 334 and 336 may be fixed, for example, with pasted onto a surface of the filter 332 or buried therein. Furthermore, similarly arranging photodetectors on a display side 322 of the filter 332, the display color can be detected for correction thereof. Also in the case of display color sensors, like in the external light sensors, there may be disposed a plurality of display color sensors in consideration of the positional relationships to achieve the correction for each display position. Moreover, signals attained from the color sensors may be sent to the display 322 via a signal line integrally disposed in the retainers 333 and 334 or may be sensed by a wireless system employing a radio wave, an infrared ray, or the like.

Considering distance between the video display and the user, the quantity of light observed by the user is minimized as the distance increases and hence it is necessary to set the contrast control to a higher value, thereby increasing the display brightness. Description will now be given of means for measuring the distance between the user and the video display of FIG. 43. The user 324 operates the mouse 327 and the keyboard 326. Consequently, distances respectively between the user 324 and the computer 325 and the display 322 can be obtained by measuring lengths of cords or wirings of the mouse 327 and keyboard 326, respectively. In short, assume that the cords respectively of the mouse 327, the keyboard 326, and the computer 325 are accommodated respectively therein in a rolled state. In operation, when the cords are unrolled, the lengths respectively of the unrolled portions thereof need only be determined according to the number of rotations or divisions or marks beforehand disposed on the cords, thereby measuring the distances above. Alternatively, infrared ray sensors may be arranged at the positions of the external light sensors 330 and 331 and on the filter 332 of FIG. 44 to measure the distances.

Figure 45:
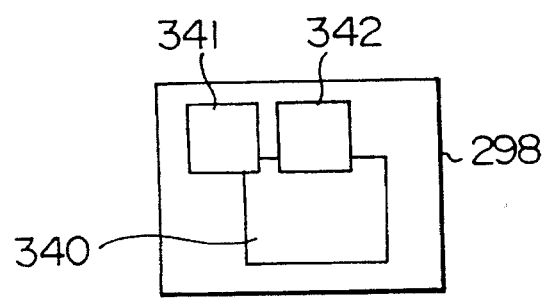
FIG. 45 is an explanatory diagram showing an example of a display screen in a case where an video display operation is conducted according to a multiwindow scheme in a video display apparatus employed in a multimedia system.

Next, description will be given of a case in which a video display using the color corrector is applied to a multimedia system. FIG. 45 shows in an explanatory diagram an example of a display screen presenting images according to a multiwindow scheme on a video display employed in a multimedia system. In a multimedia system, it is necessary to process image or video information items received from a plurality of video media. Consequently, as shown in FIG. 45, there is conducted in many cases a multiwindow image presentation in which video display windows 304 to 342 are arranged in an effective display area 298 of the video display. However, since the color setting may occasionally vary between the windows 340 to 342, there possible occurs destruction of the color specification in windows of the conventional video display depending on cases. That is, the color temperature of white display is set to, for example, 9300K in conventional computer displays in most cases such that the images are usually processed also according to the color temperature in the computer. However, for television images conforming to the NTSC and MUSE, the color temperature of white display is set to 6500K. This consequently leads to a problem that when the television images according to the NTSC and MUSE are displayed on the computer display, there is resultantly developed a bluish hue. To overcome this difficulty, there can be considered a countermeasure to control the color setting of the computer display together with the display image. However, in the case of the multiwindow image display as shown in FIG. 45, a plurality of color setting screens possibly exist in an identical screen and hence it is impossible to correct the color setting for all image display windows.

Figure 46:
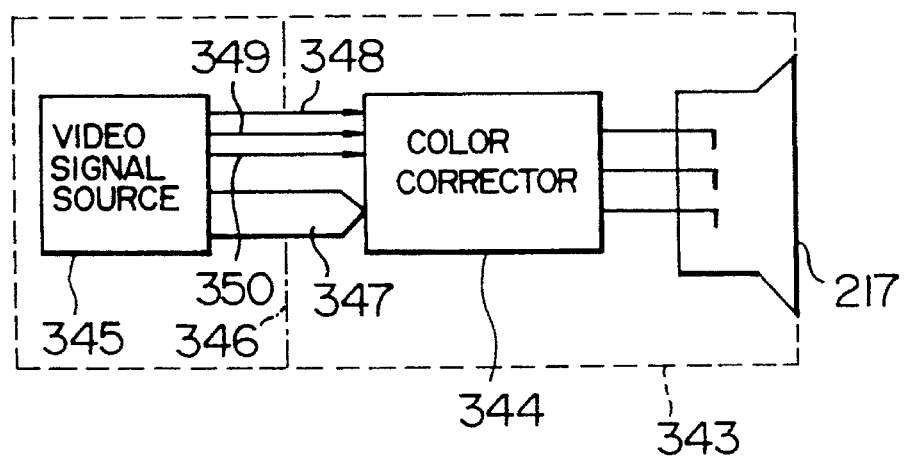
FIG. 46 is a diagram showing the construction of a video receiver as a 13th embodiment according to the present invention.

Description will now be given of an embodiment capable of solving the problem of the multiwindow image display. FIG. 46 is a configuration diagram showing a video receiver in a 13th embodiment according to the present invention. In FIG. 46, the video display 343 includes a color Braun tube 217 and a color corrector 344 of the type described above. A video signal source 345 such as a computer is disposed at a position external with respect to the display 343 as indicated by a dot-and-dash line 346. Alternatively, the source 345 may be arranged therein as denoted by a portion of the diagram in which the line 346 is missing. Video signals sent from the signal source 345 are delivered via signal lines 348 and 350 to a color corrector 344 to be subjected to a color setting correction, thereby supplying the corrected signals to the Braun tube 217. The color setting operation in this situation is accomplished in response to a control signal sent from the signal source 345 via a signal line 347 to the color corrector 344. In this connection, the control signal for the correction is transmitted in synchronism with a display position of the video signals. In the operation, the color setting may be corrected by controlling the amplitude ratios between the primary color signals in the video signal source 345. However, when the amplitude ratio between the primary color signals is thus adjusted, it is necessary to reserve a follow-up range for the color setting. Consequently, the signal input dynamic range of the video display 343 cannot be efficiently utilized and the display brightness is inevitably lowered. In contrast thereto, when the color setting correction is accomplished in the display 343 as described above, the dynamic range can be effectively used to guarantee the maximum display brightness. As a result, it is possible to correct the color setting for all video display windows.

Figure 47:
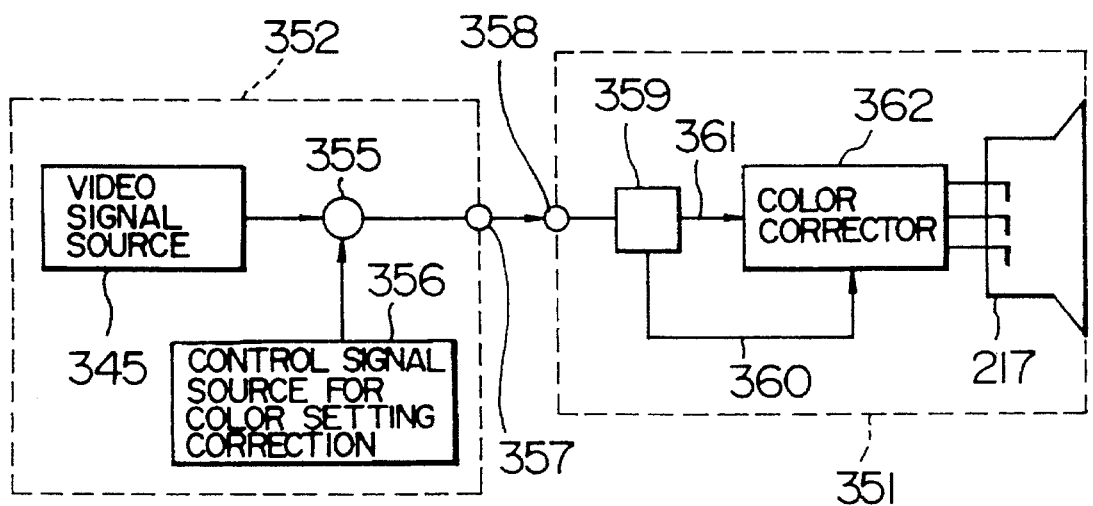
FIG. 47 is a diagram showing the construction of a video receiver as an 14th embodiment according to the present invention.

Description will be given of another embodiment capable of removing the problem of the multiwindow video presentation. FIG. 47 shows the configuration of a video receiver in a 14th embodiment according to the present invention. In FIG. 47, a mixed output terminal 357 of a video and control signal source 352 including a video signal source 345, a control signal source 356 for color setting, and a mixer 355 is connected to an input terminal 358 of a video display 351 including a control signal separator 359, a color corrector 362, and a color Braun tube 217. The video signal source produces a video signal, whereas the control signal source 356 outputs a control signal for color setting correction. In the mixer 355, for example, a carrier of which a frequency varies according to the color setting is modified on the basis of the video signal or the control signal having a dc value associated with the color setting is added to the video signal to obtain a mixed output signal. The resultant signal is delivered from the output terminal 357. In the control signal separator 359, the mixed output signal received from the input terminal 358 is modified on the basis of a demodulation frequency according to the color setting and the added dc value is sensed, thereby separating the control signal for color setting correction from the video signal. The obtained control signal and video signals are sent respectively via signal lines 360 and 361 to the color corrector 362. The signal undergone the color setting correction is passed to the color Braun tube 217. According to the embodiment, the color setting can be corrected for all video display windows without increasing the number of signal lines to transmit control signals for color setting correction between the video and control signal source 352 and the video display 351.

According to the present invention, there can be provided a color corrector in which the correction precision of the gamma correction circuit is increased and the parameter γ of the correction circuit can be easily changed. In consequence, applying the color correction of the present invention, the high-fidelity color reproduction is enabled between the transmission and reception systems, thereby improving performance and functions of various video apparatuses.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A color corrector receiving a video signal as an input signal and producing an output signal representing a function of power of the input signal, comprising:

an amplifier having a nonlinear input/output characteristic, the amplifier receiving and amplifying the video signal according to the nonlinear input/output characteristic, the amplifier having a differential pair of transistors having a common connection terminal and an output terminal, the common connection terminal receiving the video signal in the form of a current, the output terminal of the differential pair outputting the signal in the form of a current; and a variable dc voltage source connected to a control signal terminal of one of the transistors of the differential pair for achieving a shift operation for adjustment of a dc operation point of the amplifier, thereby enabling the amplifier to conduct an amplification according to the nonlinear input/output characteristic, the characteristic being represented with substantially a function of power.

2. A color corrector receiving a video signal as an input signal and producing an output signal representing a function of power of the input signal, comprising:

a logarithmic converter for producing an output signal representing a logarithmic function of the video signal;

variable gain amplifier means for receiving the output signal from said logarithmic converter as an input signal and adjusting an amplitude of an output signal from the variable gain amplifier means by varying a gain thereof; and an antilogarithmic converter for producing a signal representing an exponential function of the output signal from the variable gain amplifier means, wherein:

the logarithmic converter includes a first functional device passing therethrough a current according to the video signal and having a current-voltage conversion characteristic representable by a logarithmic function and a second functional device passing therethrough a first reference current as a reference of magnitude of the current according to the video signal; and the antilogarithmic converter includes a third functional device passing therethrough a current according to a signal obtained through an exponential conversion and having a current-voltage characteristic representable by an exponential function and a fourth functional device passing therethrough a second reference current as a reference of magnitude of the current obtained through the exponential conversion.

3. A color corrector according to claim 2, wherein the functional devices are metal-oxide semiconductor field-effect transistors.

4. A video display receiving as input signals thereto signals of three primary colors respectively corresponding to different colors for displaying thereon an image by a display device according to the input signals, comprising three gamma correctors respectively having color correctors according to claim 2, the color correctors receiving as video input signals respectively of the three primary color signals, each of the gamma correctors compensating, by an adjusting function of the color corrector thereof, for a nonlinear characteristic between the primary color signal of the input signal and luminance of light emission of the display device, thereby supplying an output signal undergone the compensation to the display device.

5. A video display according to claim 4, further including:

input terminals for respectively receiving the three primary color signals;

variable gain drive controllers for respectively controlling amplitude of three primary color signals; and cutoff controllers for respectively adjusting dc levels respectively of the three primary color signals, wherein the gamma correctors are respectively disposed on a side (a preceding stage) respectively near the input terminal sides with respect to the variable gain drive controllers and the cutoff controllers.

6. A video display according to claim 4, further including:

input terminals for respectively receiving the three primary color signals;

variable gain drive controllers for respectively controlling amplitude of three primary color signals; and cutoff controllers for respectively adjusting dc levels respectively of the three primary color signals, wherein the gamma correctors are respectively disposed between the variable gain drive controllers and the cutoff controllers.

7. A video display according to claim 4, further including:

input terminals for respectively receiving the three primary color signals;

variable gain drive controllers for respectively controlling amplitude of three primary color signals; and cutoff controllers for respectively adjusting dc levels respectively of the three primary color signals, wherein the gamma correctors are respectively disposed in a succeeding stage near the display device side with respect to the variable gain drive controllers and the cutoff controllers.

8. A video display according to claim 4, further including:

a reference signal source for supplying in a white balance adjusting operation a reference signal to the display device;

beam current sense means for sensing beam currents flowing when the reference signal is supplied;

variable gain drive controllers for respectively controlling amplitude of three primary color signals; and cutoff controllers for respectively adjusting dc levels respectively of the three primary color signals, wherein:

the drive controllers and the cutoff controllers control the beam currents flowing into the display device according to sense results obtained from the beam current sense means; and each of the gamma correctors compensates for the nonlinear characteristic according to the sense results from the beam current sense means.

9. A video display according to claim 8, wherein the display device is a cathode-ray tube (CRT), the display further including deflection modulation means for modulating a deflection current flowing through a deflection coil of the CRT, the deflection current being modulated by the deflection modulation means when the reference signal is supplied to the display device in a white balance adjustment, thereby removing electron beams of the CRT from an effective display screen area of the CRT.

10. A video display according to claim 8, wherein the display device is a cathode-ray tube (CRT), the display further including memory means for keeping therein control data related to control of at least one of the groups including the drive controllers, the cutoff controllers, and the gamma correctors, the sense results being written and stored in the memory means when the reference signal is supplied to the display device in a white balance adjustment, the sense results kept in the memory means being read therefrom in an ordinary operation, thereby controlling at least one of the groups including the drive controllers, the cutoff controllers, and the gamma correctors.

11. A video display according to claim 4, further including photodetector means for sensing colors of light emission of the display device, wherein according to sense results of the photodetector means, the drive controllers control the amplitude, the cutoff controllers adjust the dc levels, and the gamma correctors compensate for the nonlinear characteristics, thereby adjusting the white balance of an image on the display device.

12. A video display according to claim 4, further including sensor means for measuring intensity of light illumination in the periphery of the display device, thereby adjusting the white balance of an image on the display device according to a measurement result of the sensor means.

13. A video display according to claim 4, further including means for generating the video signal and a control signal the control signal specifying a particular screen area of the display device, wherein the color correctors compensate for the nonlinear characteristics in the specified particular screen area according to the control signal.

14. A method of adjusting a white balance in the video display according to claim 4, comprising the steps of:

displaying on the display device an image corresponding to input signals including the three primary color signals with a first luminance;

adjusting by the cutoff controllers the dc levels of the input signals;

displaying on the display device an image corresponding to input signals with a second luminance higher than the first luminance;

controlling by the variable gain drive controllers the amplitude of the input signals;

displaying on the display device an image corresponding to input signals with a luminance between the first luminance and the second luminance;

compensating by the gamma correctors for the nonlinear characteristics; and repeating, when necessary, the dc level adjustment and the amplitude control operation.

15. A method according to claim 14, wherein the nonlinear characteristics are compensated for without altering a state of the input signals in which the amplitude thereof is adjusted.

16. A method of adjusting a white balance in the video display according to claim 4, comprising the steps of:

displaying on the display device an image corresponding to input signals including the three primary color signals with a first luminance;

adjusting by the cutoff controllers the dc levels of the input signals;

displaying on the display device an image corresponding to input signals with a second luminance higher than the first luminance;

controlling by the variable gain drive controllers the amplitude of the input signals;

displaying on the display device an image corresponding to input signals with a third luminance between the first luminance and the second luminance;

compensating by the gamma correctors for the nonlinear characteristics according to a predetermined gamma characteristic;

displaying on the display device an image corresponding to input signals with a fourth luminance between the first luminance and the third luminance; and compensating by the gamma correctors for the nonlinear characteristics according to a gamma characteristic other than the predetermined gamma characteristic.

17. A method of adjusting colors in a video apparatus according to claim 37, comprising the steps of:

adjusting the gamma correctors for adjusting a color reproducibility for development of a color reproduction characteristic line passing through a first chromaticity point in a chromaticity region of a first luminance and a second chromaticity point in a chromaticity region of a second luminance higher than the first luminance; and adjusting the gamma correctors for adjusting a color reproducibility for development of the color reproduction characteristic line passing, in a state thereof passing through either one of the first and second chromaticity points, through a third chromaticity point in a chromaticity region of luminance between the first luminance and the second luminance.

18. A video display receiving as an input signal thereto a primary color signal corresponding to at least one of the primary colors for displaying thereon an image by a display device according to the input signal, comprising a gamma corrector having a color corrector according to claim 2, the gamma corrector compensating, by an adjusting function of the color corrector thereof, for a nonlinear characteristic between the primary color signal of the input signal and luminance of light emission of the display device, thereby supplying an output signal undergone the compensation to the display device.

19. A color corrector receiving a video signal as an input signal and producing an output signal representing a function of power of the input signal, comprising:

a logarithmic converter for producing an output signal representing a logarithmic function of the video signal;

amplifier means for receiving the output signal from said logarithmic converter as an input signal and adjusting an amplitude of an output signal from the amplifier means;

an antilogarithmic converter for producing a signal representing an exponential function of the output signal from the amplifier means; and a signal transfer path of a differential configuration ranging from an output of the logarithmic converter via the amplifier means to an input of the antilogarithmic converter.

20. A color corrector according to claim 19, wherein the amplifier means includes a variable gain amplifier.

21. A color corrector according to claim 19, wherein the logarithmic converter includes a first transistor and a second transistor respectively having base terminals connected to each other, the logarithmic converter producing, in response to the video signal supplied to an emitter terminal of the first transistor, a signal representing a logarithmic function of the video signal in a differential signal format between emitter terminals respectively of the first and second transistors.

22. A color corrector according to claim 21, wherein the functional devices are MOSFETs.

23. A color corrector according to claim 19, wherein the logarithmic converter includes:

a first transistor having an emitter terminal receiving the video signal; and a second transistor having a base terminal connected to the emitter terminal of the first transistor, a polarity opposite to that of the first transistor, and an emitter terminal receiving a reference current, the logarithmic converter producing a signal representing a logarithmic function of the video signal in a differential signal format between the base terminal of the first transistor and the emitter terminal of the second transistor.

24. A color corrector according to claim 19, wherein the logarithmic converter includes:

a first transistor and a second transistor each having an identical polarity and respectively having base terminals connected to each other;

a third transistor having an emitter terminal connected to an emitter terminal of the first transistor and having a polarity opposite to that of the first transistor; and a fourth transistor having an emitter terminal connected to an emitter terminal of the second transistor and having a polarity opposite to that of the second transistor;

the logarithmic converter producing, in response to the video signal supplied to a collector terminal of the first transistor, a signal representing a logarithmic function of the video signal in a differential signal format between the base terminals respectively of the third and fourth transistors.

25. A color corrector according to claim 16, further including a diode connected between the base terminals respectively of the first and third transistors, between the base and emitter terminals of the first transistor, or between the base and emitter terminals of the third transistor.

26. A color corrector according to claim 24, wherein the logarithmic converter includes a fifth transistor having a base terminal connected to a bias source and an emitter terminal connected to a collector terminal of the third transistor, thereby producing a signal representing a logarithmic function of the video signal in a differential signal format between the base terminals respectively of the third and fourth transistors.

27. A color corrector according to claim 24, wherein the logarithmic converter includes a fifth transistor having a base terminal and an emitter terminal respectively connected to a collector terminal and a base terminal of the fourth transistor, thereby producing, in response to the video signal supplied to a collector terminal of the first transistor, a signal representing a logarithmic function of the video signal in a differential signal format between the base terminals respectively of the third and fourth transistors.

28. A color corrector according to claim 24, wherein the logarithmic converter includes a fifth transistor having an emitter terminal connected to a collector terminal of the second transistor and a base terminal connected to a bias source, thereby producing, in response to the video signal supplied to a collector terminal of the first transistor, a signal representing a logarithmic function of the video signal in a differential signal format between the base terminals respectively of the third and fourth transistors.

29. A color corrector according to claim 16, wherein the functional devices are MOSFETs.

30. A signal converter for producing an output signal representing a function of power of an input signal, comprising:
- a logarithmic converter producing a signal representing a logarithmic function of the input signal;
- amplifier means for receiving the output signal from said logarithmic converter as an input signal and adjusting an amplitude of an output signal from the amplifier means;
- an antilogarithmic converter for producing a signal representing an exponential function of the output signal from the amplifier means; and
- a signal transfer path of a differential configuration ranging from an output of the logarithmic converter via the amplifier means to an input of the antilogarithmic converter.

31. A signal converter according to claim 30, wherein the logarithmic converter includes a first transistor and a second transistor respectively having base terminals connected to each other,
the logarithmic converter producing, in response to the input signal supplied to an emitter terminal of the first transistor, a signal representing a logarithmic function of the input signal in a differential signal format between emitter terminals respectively of the first and second transistors.

32. A signal converter according to claim 30, wherein the logarithmic converter includes:
- a first transistor and a second transistor each having an identical polarity and respectively having base terminals connected to each other;
- a third transistor having an emitter terminal connected to an emitter terminal of the first transistor and having a polarity opposite to that of the first transistor; and
- a fourth transistor having an emitter terminal connected to an emitter terminal of the second transistor and having a polarity opposite to that of the second transistor;
- the logarithmic converter producing, in response to the input signal supplied to a collector terminal of the first transistor, a signal representing a logarithmic function of the input signal in a differential signal format between the base terminals respectively of the third and fourth transistors.

33. A signal converter according to claim 32, further including a diode connected between the base terminals respectively of the first and third transistors, between the base and emitter terminals of the first transistor, or between the base and emitter terminals of the third transistor.

34. A signal converter according to claim 33, wherein the transistors are MOSFETs.

35. A signal converter according to claim 32, wherein the logarithmic converter includes a fifth transistor having a base terminal connected to a bias source and an emitter terminal connected to a collector terminal of the third transistor, thereby producing a signal representing a logarithmic function of the input signal in a differential signal format between the base terminals respectively of the third and fourth transistors.

36. A signal converter according to claim 32, wherein the logarithmic converter includes a fifth transistor having a base terminal and an emitter terminal respectively connected to a collector terminal and a base terminal of the fourth transistor, thereby producing, in response to the input signal supplied to a collector terminal of the first transistor, a signal representing a logarithmic function of the input signal in a differential signal format between the base terminals respectively of the third and fourth transistors.

37. A signal converter according to claim 32, wherein the logarithmic converter includes a fifth transistor having an emitter terminal connected to a collector terminal of the second transistor and a base terminal connected to a bias source, thereby producing, in response to the input signal supplied to a collector terminal of the first transistor, a signal representing a logarithmic function of the input signal in a differential signal format between the base terminals respectively of the third and fourth transistors.

38. A signal converter according to claim 32, wherein the transistors are MOSFETs.

39. A signal converter according to claim 30, wherein the antilogarithmic converter includes:
- a first transistor and a second transistor; and
- a third transistor and a fourth transistor respectively having base terminals connected to each other,
- the first and second transistors respectively having emitter terminals respectively connected to emitter terminals respectively of the third and fourth transistors,
- the signal converter producing, in response to the input signal supplied between the base terminals respectively of the first and second transistors, a signal representing an exponential function of the input signal from a collector terminal of the fourth transistor.

40. A signal converter according to claim 39, wherein the antilogarithmic converter includes a fifth transistor having an emitter terminal connected to a common base terminal of the third and fourth transistors and a base terminal connected to a collector terminal of the third transistor.

41. A signal converter according to claim 39, wherein the transistors are MOSFETs.

42. A signal converter according to claim 40, wherein the transistors are MOSFETs.

* * * * *